US012604012B2

(12) United States Patent
Wang et al.

(10) Patent No.: US 12,604,012 B2
(45) Date of Patent: Apr. 14, 2026

(54) CODING METHOD, ENCODER, AND DECODER

(71) Applicant: GUANGDONG OPPO MOBILE TELECOMMUNICATIONS CORP., LTD., Dongguan (CN)

(72) Inventors: Fan Wang, Dongguan (CN); Zhihuang Xie, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 78 days.

(21) Appl. No.: 18/484,549

(22) Filed: Oct. 11, 2023

(65) Prior Publication Data

US 2024/0056585 A1 Feb. 15, 2024

Related U.S. Application Data

(63) Continuation of application No. PCT/CN2021/086539, filed on Apr. 12, 2021.

(51) Int. Cl.
H04N 19/176 (2014.01)
H04N 19/184 (2014.01)
H04N 19/46 (2014.01)

(52) U.S. Cl.
CPC ......... H04N 19/176 (2014.11); H04N 19/184 (2014.11); H04N 19/46 (2014.11)

(58) Field of Classification Search
CPC ..... H04N 19/176; H04N 19/184; H04N 19/46
See application file for complete search history.

(56) References Cited

U.S. PATENT DOCUMENTS

| | | | |
|---|---|---|---|
| 2017/0127064 A1* | 5/2017 | Sze | H04N 19/13 |
| 2017/0142416 A1 | 5/2017 | George et al. | |

(Continued)

FOREIGN PATENT DOCUMENTS

| | | |
|---|---|---|
| CN | 103636224 | 3/2014 |
| CN | 112204972 | 1/2021 |

(Continued)

OTHER PUBLICATIONS

Sarwer et al., "AHG8: CABAC-bypass alignment for high bit-depth coding," Joint Video Experts Team (JVET) of ITU-T SG 16 WP 3 and ISO/IEC JTC 1/SC 29, JVET-U0069-v3, Jan. 2021.

(Continued)

*Primary Examiner* — Jeremiah C Hallenbeck-Huber
(74) *Attorney, Agent, or Firm* — Hodgson Russ LLP

(57) ABSTRACT

Embodiments of the disclosure provide a coding method, an encoder, and a decoder. The decoder decodes a bitstream to determine a context mode flag of a current block, determines an initial value of a quantity parameter according to the context mode flag, and determines coefficients of the current block using at least one of a context mode or a bypass mode according to the initial value of the quantity parameter. The encoder determines the context mode flag of the current block, determines the initial value of the quantity parameter according to the context mode flag, and encodes the coefficients of the current block using at least one of the context mode or the bypass mode according to the initial value of the quantity parameter to generate the bitstream.

20 Claims, 10 Drawing Sheets

(56) References Cited

U.S. PATENT DOCUMENTS

| | | | | |
|---|---|---|---|---|
| 2018/0063534 A1 | 3/2018 | Moccagatta et al. | | |
| 2020/0322607 A1 | 10/2020 | Hsiang | | |
| 2020/0322640 A1* | 10/2020 | Rusanovskyy | ........ | H04N 19/18 |
| 2023/0041262 A1* | 2/2023 | Wang | ..................... | H04N 19/13 |
| 2023/0115118 A1* | 4/2023 | Wang | ................... | H04N 19/176 |
| | | | | 375/240.02 |
| 2024/0163437 A1* | 5/2024 | Tsukuba | ............... | H04N 19/184 |
| 2024/0275970 A1* | 8/2024 | Tsukuba | ................. | H04N 19/18 |
| 2025/0016383 A1* | 1/2025 | Yu | .......................... | H04N 19/91 |

FOREIGN PATENT DOCUMENTS

| | | |
|---|---|---|
| CN | 112514389 | 3/2021 |
| WO | 2018190595 | 10/2018 |

OTHER PUBLICATIONS

WIPO, International Search Report and Written Opinion for International Application No. PCT/CN2021/086539, Jan. 13, 2022.
Chen et al., "Algorithm description for Versatile Video Coding and Test Model 11 (VTM 11)," Joint Video Experts Team (JVET) of ITU-T SG 16 WP 3 and ISO/IEC JTC 1/SC 29, Document: JVET-T2002-v1, Oct. 2020.
Bross et al., "Versatile Video Coding Editorial Refinements on Draft 10," Joint Video Experts Team (JVET) of ITU-T SG 16 WP 3 and ISO/IEC JTC 1/SC 29, Document: JVET-T2001-v1, Oct. 2020.
EPO, Extended European Search Report for EP Application No. 21936312.4, Jan. 7, 2025.

\* cited by examiner

FIG. 7

CODING METHOD, ENCODER, AND DECODER

CROSS-REFERENCE TO RELATED APPLICATION(S)

This application is a continuation of International Application No. PCT/CN2021/086539, filed Apr. 12, 2021, the entire disclosure of which is incorporated herein by reference.

TECHNICAL FIELD

Embodiments of the disclosure relate to the field of picture processing technology, and in particular to a coding method, an encoder, and a decoder.

BACKGROUND

Computer vision-related fields have received more and more attention as people demand for a higher quality of video display. In recent years, picture processing technology has successful applications in all walks of life. In a coding process of a video picture, at an encoding side, picture data to-be-encoded is transformed and quantized and then is subjected to compression encoding by an entropy coding unit, and a bitstream generated by entropy encoding will be transmitted to a decoding side. At the decoding side, the bitstream is parsed and then inverse quantization and inverse transformation are performed, so that the original input picture data may be recovered.

At present, compared with video coding with low bit depth, low quality, and low bitrate (referred to as "conventional video"), video coding with high bit depth, high quality, and high bitrate (referred to as "triple-high video") usually needs to code more and larger coefficients. In this case, using existing related solutions for the triple-high video may cause greater overhead and wastes and even affect the speed and throughput of coding.

SUMMARY

In a first aspect, a decoding method is provided in embodiments of the disclosure. The method is applied to a decoder and includes the following. A bitstream is decoded to determine a context mode flag of a current block. An initial value of a quantity parameter is determined according to the context mode flag. Coefficients of the current block are determined using at least one of a context mode or a bypass mode according to the initial value of the quantity parameter.

In a second aspect, an encoding method is provided in embodiments of the disclosure. The method is applied to an encoder and includes the following. A context mode flag of a current block is determined. An initial value of a quantity parameter is determined according to the context mode flag. Coefficients of the current block are encoded using at least one of a context mode or a bypass mode according to the initial value of the quantity parameter to generate a bitstream.

In a third aspect, a decoder is provided in embodiments of the disclosure. The decoder includes a processor and a memory storing a computer program which, when executed by the processor, causes the processor to perform the decoding method of the first aspect.

BRIEF DESCRIPTION OF THE DRAWINGS

FIG. 7 is a schematic diagram illustrating position relationship between a region that may have significant coefficients and a zero-out region.

DETAILED DESCRIPTION

Figures 1, 2:
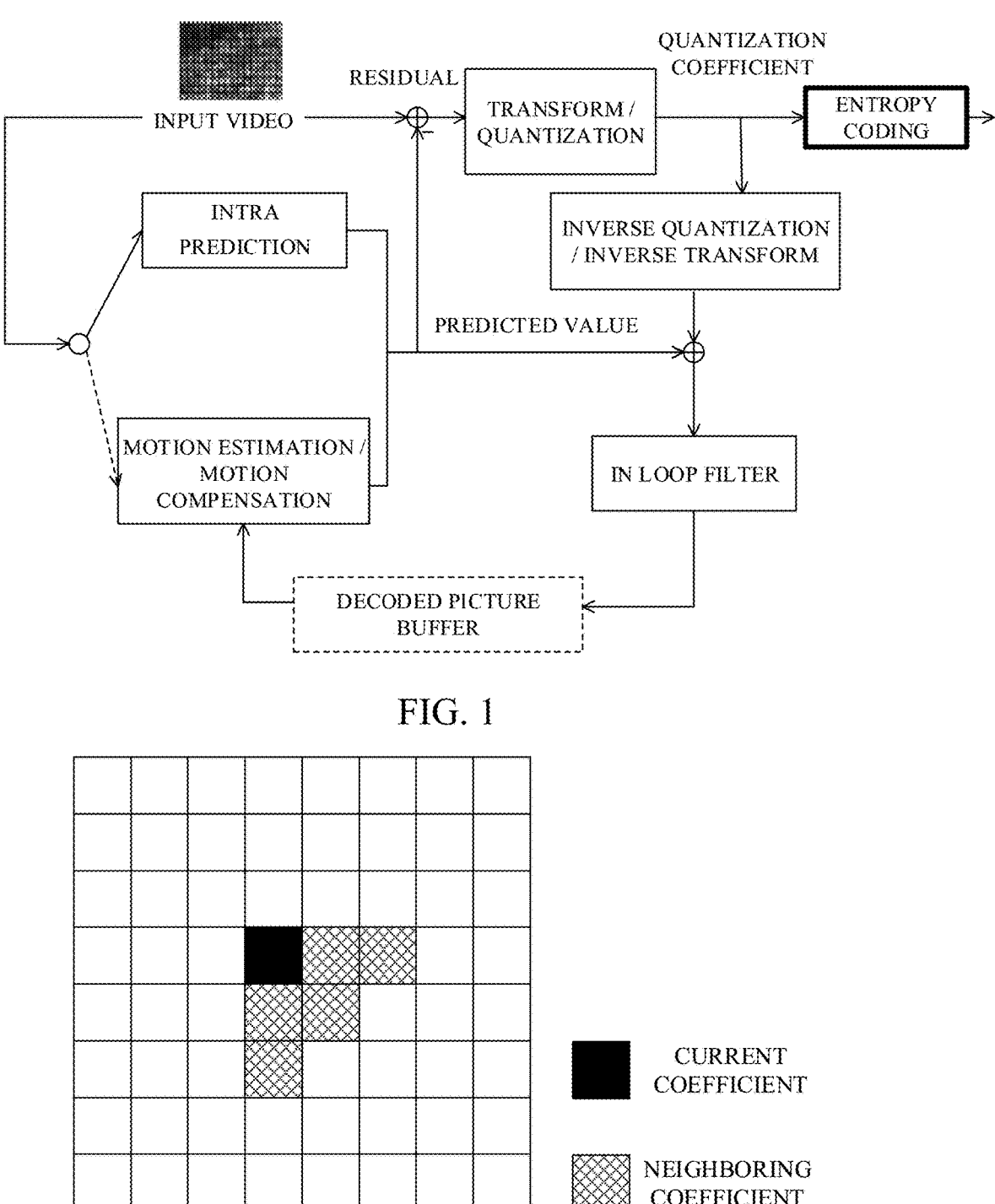
FIG. 1 is a schematic application diagram of an encoding framework provided in the related art.
FIG. 2 is a schematic diagram illustrating position relationship among a current coefficient and neighboring coefficients provided in the related art.

Technical solutions in embodiments of the disclosure will be described in a clear and complete manner with reference to the accompanying drawings in embodiments of the disclosure. It may be understood that the specific embodiments described herein are only for explaining the relevant disclosure and should not be construed as limiting the scope of the disclosure. Additionally, it may be noted that, for ease of description, only the parts related to the relevant disclosure are illustrated in the drawings.

In the following description, "some embodiments" referred to herein describe a subset of all possible embodiments. It may be understood that "some embodiments" may be a same subset or a different subset of all possible embodiments, and may be combined with each other in case of no conflict. It is also necessary to point out that, the terms "first/second/third" in the embodiments of the present disclosure are only used to distinguish similar objects and do not represent a specific order for the objects. It may be understood that "first/second/third" may be interchanged in a particular order when permitted, and therefore the embodiments of the present disclosure described herein may be implemented in an order other than that illustrated or described herein.

Currently, universal video coding standards generally use block-based hybrid coding frameworks. Each picture of a video is partitioned into largest coding units (LCUs), which are squares of equal size (e.g., 128×128, 64×64, etc.). Each LCU may also be partitioned into rectangular coding units (CUs) according to a certain rule. Furthermore, the CU may be partitioned into smaller prediction units (PUs) or transform units (TUs), etc.

Specifically, FIG. 1 is a schematic application diagram of a coding framework provided in the related art. As illustrated in FIG. 1, the hybrid coding framework may include modules for such as prediction, transform, quantization, entropy coding, and in-loop filter. The prediction module may include intra prediction and inter prediction, and the inter prediction may include motion estimation and motion compensation. Since there is strong correlation among neighbouring samples in a picture in a video, using intra prediction in video coding can eliminate spatial redundancy between neighbouring samples. Moreover, since there is also strong similarity between neighbouring pictures in the video, using inter prediction in video coding can eliminate temporal redundancy between neighbouring pictures. Thus coding efficiency can be improved.

The basic process of a video coder is as follows: At an encoding side, a picture is partitioned into blocks. The intra prediction or the inter prediction is applied to the current block to generate a prediction block of the current block. The prediction block is subtracted from the original block of the current block to obtain a residual block. The residual block is then subjected to transform and quantization to generate a quantization coefficient matrix. The quantization coefficient matrix is entropy-encoded and output to a bitstream. At a decoding side, the intra prediction or the inter prediction is applied to the current block to generate the prediction block of the current block. In addition, the bitstream is decoded to obtain the quantization coefficient matrix. The quantization coefficient matrix is inverse-quantized and inverse-transformed to obtain the residual block, which is added to the prediction block to obtain a reconstructed block. The reconstructed blocks form a reconstructed picture. The reconstructed picture is in-loop filtered on a picture or block basis to obtain a decoded picture. The encoding side also requires similar operations as the decoding side to obtain the decoded picture. The decoded picture may be used as a reference picture in the inter prediction for subsequent pictures. Block partition information, and mode information or parameter information (such as for prediction, transform, quantization, entropy coding, and in-loop filter) determined at the encoding side, are output to the bitstream if necessary. By parsing and analysing based on available information, the decoding side determines the same block partition information, and mode information or parameter information (such as for prediction, transform, quantization, entropy coding, and in-loop filter) as those of the encoder side, thereby ensuring that the decoded picture obtained by the encoding side is the same as the decoded picture obtained by the decoding side. The decoded picture obtained by the encoding side is also typically called the reconstructed picture. The current block may be partitioned into PUs during prediction. The current block may be partitioned into TUs during transformation. The partition of the PUs and the partition of the TUs may be different. The above is the basic process of the video coder under the block-based hybrid coding framework. With the development of technology, some modules or operations of the framework or the process may be optimized. The embodiments of the present disclosure are applicable to the basic process of the video coder under the block-based hybrid coding framework, but are not limited to the framework and the process.

The current block may be a current CU, current PU, current TU, etc.

The block partition information, the mode information or parameter information for prediction, transform, and quantization, coefficients and the like are signalled into the bitstream through entropy coding. Assuming that probabilities of different elements are different, a shorter codeword is allocated to an element with a larger probability of occurrence, and a longer codeword is allocated to an element with a smaller probability of occurrence, so that higher coding efficiency than that of fixed-length coding can be obtained. However, if the probabilities of different elements are close or substantially the same, the entropy coding results in limited compression.

Context-based adaptive binary arithmetic coding (CABAC) is a common entropy coding method, which is used in both video compression standards high efficiency video coding (HEVC) and versatile video coding (VVC) for entropy coding. The CABAC can improve compression efficiency by using a context model. However, using and updating the context model lead to more complex operations. The CABAC has a bypass mode, in which there is no need to use or update the context model, and thus higher throughput can be achieved. In the present disclosure, a mode requiring using and updating the context model in the CABAC may be called a context mode.

Generally, the context model needs to be determined according to a specified method. When invoking a specified arithmetic decoding process for a binary decision, parameters of the context model may be used as inputs. There is also a dependency relationship among neighboring coefficients in selection of the context model. For example, FIG. 2 is a schematic diagram illustrating position relationship among a current coefficient and neighboring coefficients provided in the related art. In FIG. 2, a block in black indicates the current coefficient, and blocks with grid lines indicate the neighboring coefficients. As illustrated in FIG. 2, which context model is selected for sig_coeff_flag of the current coefficient needs to be determined according to information of five neighboring coefficients to the right, lower, and lower right of the current coefficient. As can be seen from FIG. 2, operations of the context mode are more complex than operations for the bypass mode, and there is dependence between neighboring coefficients.

For an arithmetic coding engine of the CABAC, if the context mode is used, the specified arithmetic decoding process for a binary decision needs to be invoked, which includes a state transition process, namely the updating of the context model. During the arithmetic decoding process for a binary decision, a renormalization process of the arithmetic decoding engine is invoked. If the bypass mode is used, a bypass decoding process needs to be invoked.

The CABAC used in the VVC is introduced as an example as follows.

For the arithmetic coding engine of CABAC, inputs to the arithmetic decoding process are ctxTable, ctxIdx, bypassFlag, and state variables ivlCurrRange and ivlOffset of the arithmetic decoding engine, and an output of the arithmetic decoding process is a value of bin.

ctxTable is a table used in selection of the context mode. ctxIdx is an index of the context model.

Figure 3:
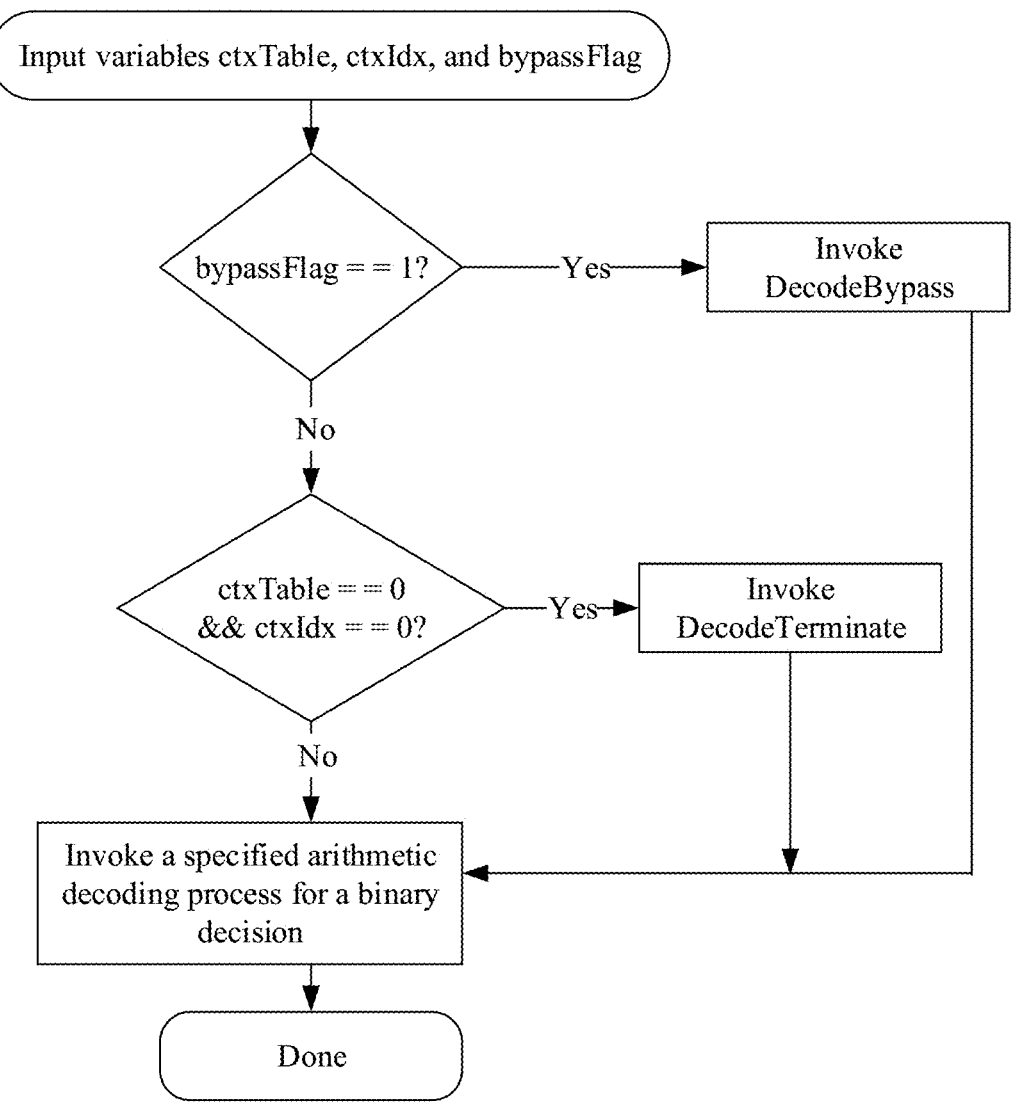
FIG. 3 is a schematic flowchart of an arithmetic decoding process for bin provided in the related art.

FIG. 3 is a schematic flowchart of an arithmetic decoding process for a bin provided in the related art. As illustrated in FIG. 3, in order to decode the value of bin, the context index table ctxTable, ctxIdx, bypassFlag are passed as inputs to the arithmetic decoding process DecodeBin (ctxTable, ctxIdx, bypassFlag), which is specified as follows.

If bypassFlag is equal to 1, then a bypass decoding process DecodeBypass( ) is invoked.

Otherwise, if bypassFlag is equal to 0, ctxTable is equal to 0, and ctxIdx is equal to 0, then DecodeTerminate( ) is invoked.

Otherwise (bypassFlag is equal to 0 and ctxIdx is not equal to 0), the specified arithmetic decoding process for a binary decision DecodeDecision(ctxTable, ctxIdx) is invoked.

Further, inputs to the arithmetic decoding process for a binary decision are variables ctxTable, ctxIdx, ivlCurrRange, and ivlOffset, and outputs of the arithmetic decoding process are a decoded value binVal and updated variables of ivlCurrRange and ivlOffset.

Figure 4:
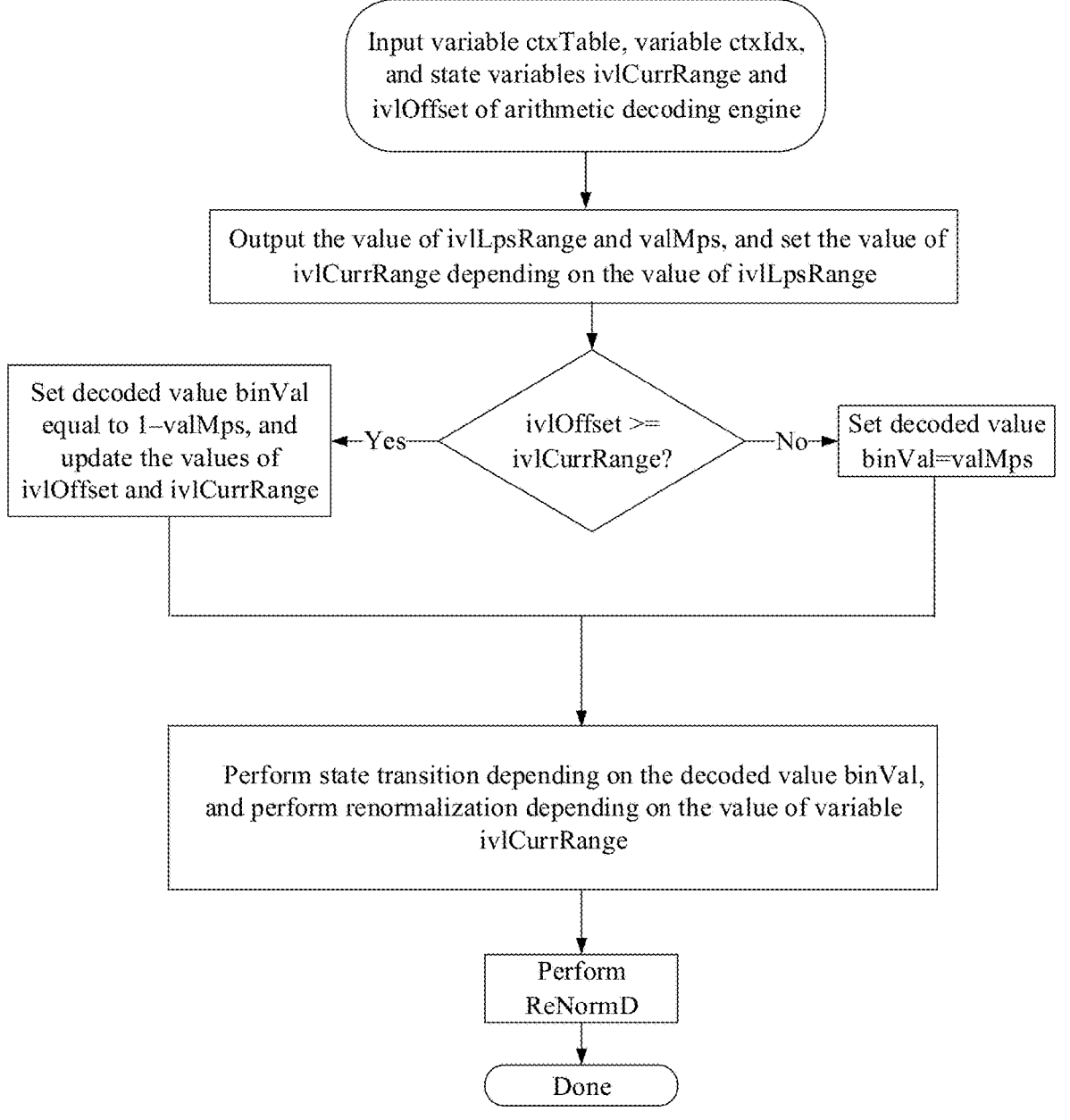
FIG. 4 is a schematic flowchart of an arithmetic decoding process for binary decision provided in the related art.

FIG. 4 is a schematic flowchart of an arithmetic decoding process for a binary decision provided in the related art. As illustrated in FIG. 4, pStateIdx0 and pStateIdx1 are two states of the current context model.

1. A value of variable ivlLpsRange is derived as follows:

Given a current value of ivlCurrRange, variable qRangeIdx is derived as follows:

qRangeIdx=ivlCurrRange>>5

Given qRangeIdx, pStateIdx0 and pStateIdx1 associated with ctxTable and ctxIdx, valMps and ivlLpsRange are derived as follows:

pState=pStateIdx1+16×pStateIdx0 valMps=pState>>14 ivlLpsRange=(qRangeIdx×((valMps?32767-pState: pState)>>9)>>1)+4.

2. A value of ivlCurrRange is set equal to ivlCurrRange-ivlLpsRange, and the following operations are performed:

If ivlOffset is greater than or equal to ivlCurrRange, then the value of variable binVal is set equal to 1-valMps, ivlOffset is decremented by ivlCurrRange, and ivlCurrRange is set equal to ivlLpsRange.

Otherwise (ivlOffset is less than ivlCurrRange), the value of variable binVal is set equal to valMps.

Given the value of binVal, a specified state transition is performed. Depending on the current value of ivlCurrRange, a specified renormalization may be performed.

Further, inputs to the state transition process are the current pStateIdx0 and pStateIdx1, and the decoded value binVal. Outputs of the process are updated context variables pStateIdx0 and pStateIdx1 associated with ctxTable and ctxIdx. Variables shift0 and shift1 are derived from shiftIdx. The correspondence between shiftIdx, and ctxTable and ctxIdx is specified as follows:

shift0=(shiftIdx>>2)+2 shift1=(shiftIdx & 3)+3+shift0.

Depending on the decoded value binVal, the update of the two variables pStateIdx0 and pStateIdx1 corresponding to ctxTable and ctxIdx are as follows:

pStateIdx0=pStateIdx0-(pStateIdx0>>shift0)+(1023× binVal>>shift0)

pStateIdx1=pStateIdx1-(pStateIdx1>>shift1)+(16383× binVal>>shift1).

Further, inputs to the renormalization process of the arithmetic decoding engine are bits from slice data and the variables ivlCurrRange and ivlOffset. Outputs of the process are updated variables ivlCurrRange and ivlOffset.

Figures 5, 6:
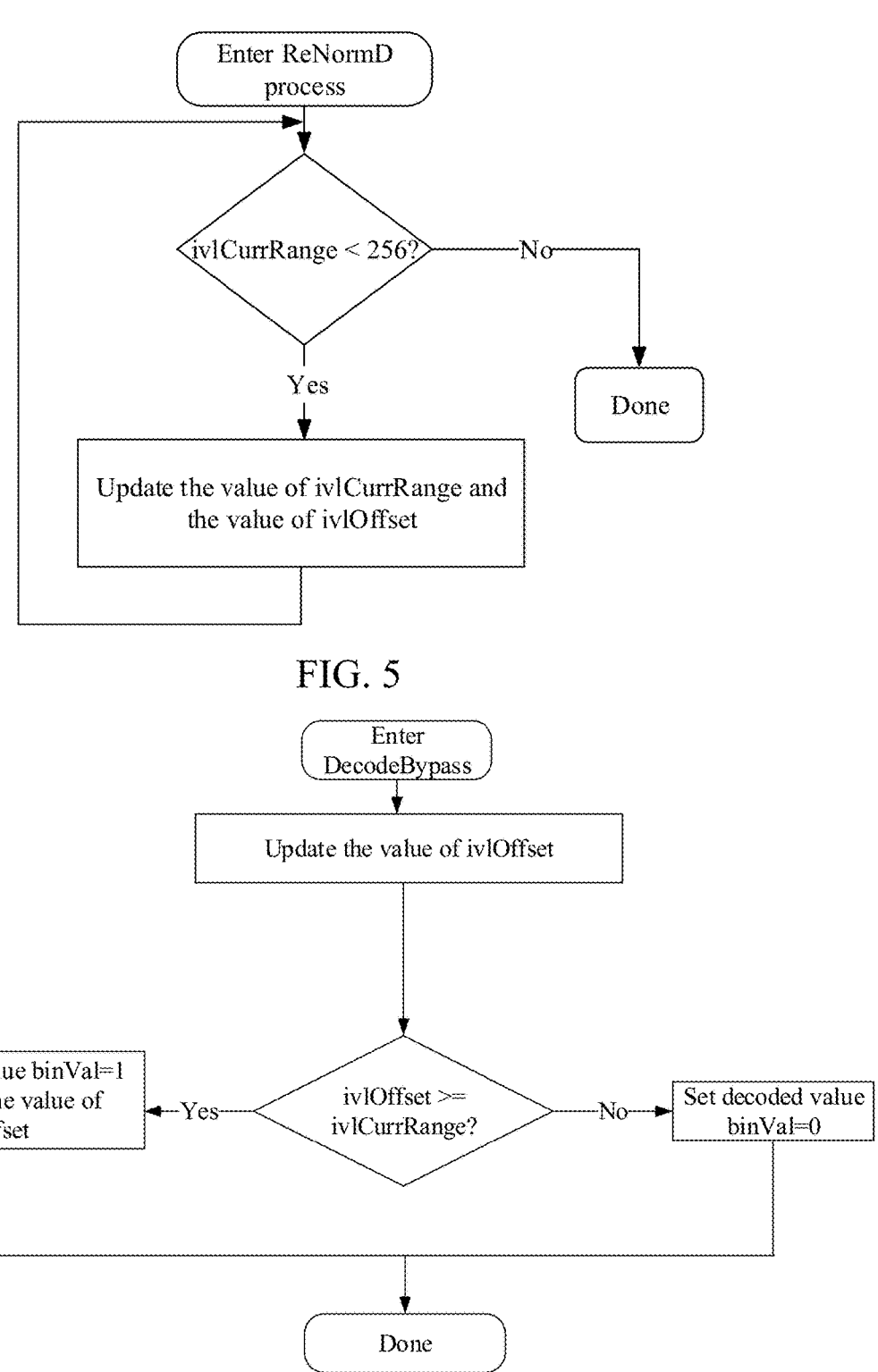
FIG. 5 is a schematic flowchart of a renormalization of an arithmetic decoding engine provided in the related art.
FIG. 6 is a schematic flowchart of a bypass decoding process provided in the related art.

FIG. 5 is a schematic flowchart of the renormalization of the arithmetic decoding engine provided in the related art. As illustrated in FIG. 5, the current value of ivlCurrRange is first compared to 256, and subsequent operations are as follows:

If ivlCurrRange is greater than or equal to 256, no renormalization is needed and the RenormD process is finished.

Otherwise (ivlCurrRange is less than 256), a renormalization loop is entered. Within this loop, the value of ivlCurrRange is doubled, i.e. left-shifted by 1. The value of ivlOffset is doubled, i.e. left-shifted by 1. A single bit is shifted into ivlOffset by using read_bits (1).

The bitstream shall not contain data that result in a value of ivlOffset being greater than or equal to ivlCurrRange upon completion of this process.

Further, inputs to the bypass decoding process for binary decisions are bits from the slice data and the variables ivlCurrRange and ivlOffset. Outputs of this process are updated variable ivlOffset and the sovled value binVal. The bypass decoding process is invoked when bypassFlag is equal to 1.

FIG. 6 is a schematic flowchart of a bypass decoding process provided in the related art. As illustrated in FIG. 6, first, the value of ivlOffset is doubled, i.e. left-shifted by 1 and a single bit is shifted into ivlOffset by using read_bits (1). Then, the value of ivlOffset is compared to the value of ivlCurrRange and subsequent steps are as follows:

If ivlOffset is greater than or equal to ivlCurrRange, the value of binVal is set equal to 1, ivlOffset is equal to ivlOffset is decremented by ivlCurrRange.

Otherwise (ivlOffset is less than ivlCurrRange), binVal is set equal to 0.

The bitstream shall not contain data that result in a value of ivlOffset being greater than or equal to ivlCurrRange upon completion of this process.

It should also be understood that in current video coding standards, one or more transforms and transform skips are typically supported for residuals. The transforms include discrete cosine transform (DCT), etc. A transformed residual block usually exhibits certain characteristics after transform (and quantization). For example, after some transforms (and quantization), since energy is mostly concentrated in a low frequency region, coefficients in an upper-left region are relatively large, and coefficients in a lower-right region are relatively small or even equal to 0. For transform skip, transform is not performed. The distribution pattern of coefficients after the transform skip is different from that of coefficients after the transform, so that different coefficient coding methods may be used. For example, in the VVC, regular residual coding (RRC) is used for the coefficients after the transform skip, and transform skip residual coding (TSRC) is used for the coefficients after the transform skip.

Figure 7:
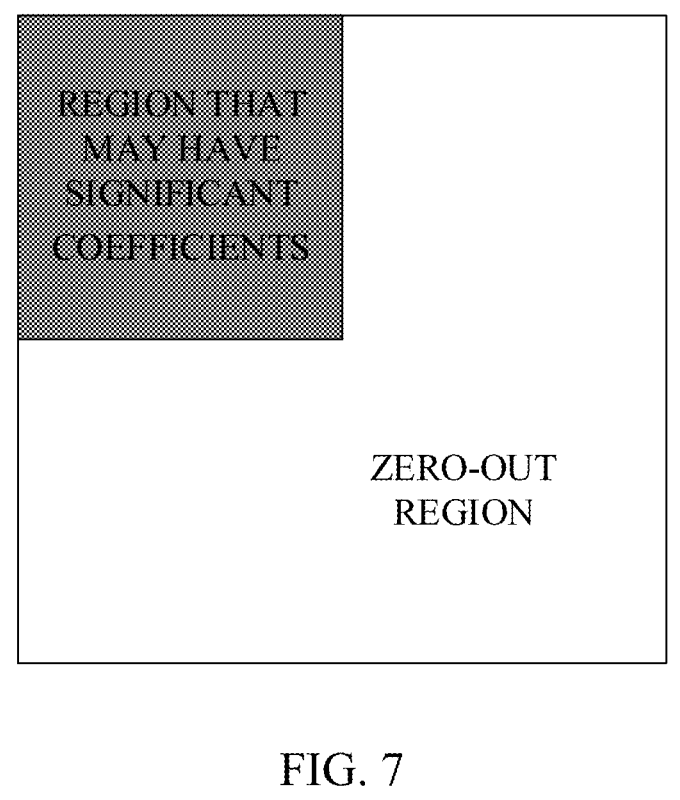

For general transforms such as DCT transform, in a transformed block, frequencies increase from left to right and from top to bottom. The upper left corner represents lower frequency, and the lower right corner represents higher frequency. Human eyes are more sensitive to low-frequency information and less sensitive to high-frequency information. With this property, processing heavily or removing some high-frequency information are less visually affecting. Some technologies, such as zero-out, may force some high-frequency information to be 0. For example, for a 64×64 block, coefficients at positions with horizontal coordinates greater than or equal to 32 or with vertical coordinates greater than or equal to 32 are forced to be 0. The foregoing is only a simple example, and there may be more complicated methods for deriving the range of the zero-out, which are not described herein. FIG. 7 is a schematic diagram illustrating position relationship between a region that possibly have significant coefficients and a zero-out region. As illustrated in FIG. 7, non-zero (or called significant) coefficients may exist in the upper-left corner (namely, the region that possibly have significant coefficients), and all the coefficients in the lower-right corner are set equal to zero (namely, the zero-out region). In this way, for the subsequent coefficient coding, the coefficients of the zero-out region do not need to be encoded because the coefficients must be 0.

Further, since the distribution of coefficients shows a characteristic that coefficients at the upper-left corner are larger and many coefficients at the lower-right corner are equal to 0 after the residuals are transformed (and quantized) in a common video, during coefficients coding, some methods are generally used to code coefficients within a certain range of the upper-left corner, and not code coefficients within a certain range of the lower-right corner (these coefficients are default to 0). One method is to, when coding the coefficients of the block, first determine the position of the last significant coefficient of a block in a scanning order. After this position is determined, all coefficients following the position of the last significant coefficient in the scanning order are considered as 0, that is, no coding is required. Only the last significant coefficient and the previous coefficients thereof need to be encoded. For example, in the VVC, the position of the last significant coefficient (LastSignificant-CoeffX, LastSignificantCoeffY) is determined using last_sig_coeff_x_prefix, last_sig_coeff_y_prefix, last_sig_coeff_x_suffix, and last_sig_coeff_y_suffix.

(a) last_sig_coeff_x_prefix specifies a prefix of a horizontal (or column) coordinate of the last significant coefficient in scanning order within the current block. The value of last_sig_coeff_x_prefix shall be in the range of 0 to (log 2ZoTbWidth<<1)−1, inclusively.

If last_sig_coeff_x_prefix is not present, then last_sig_coeff_x_prefix is equal to 0.

(b) last_sig_coeff_y_prefix specifies a prefix of a vertical (or row) coordinate of the last significant coefficient in scanning order within the current block. The value of last_sig_coeff_y_prefix shall be in the range of 0 to (log 2ZoTbHeight<<1)−1, inclusively.

If last_sig_coeff_y_prefix is not present, then last_sig_coeff_y_prefix is equal to 0.

(c) last_sig_coeff_x_suffix specifies a suffix of the horizontal (or column) coordinate of the last significant coefficient in scanning order within the current block. The value of last_sig_coeff_x_suffix shall be in the range of 0 to $(1<<((last\_sig\_coeff\_x\_prefix>>1)-1))-1$, inclusively.

LastSignificantCoeffX, i.e., the value of the horizontal (or column) coordinate of the last significant coefficient in scanning order within the current transform block, is derived as follows:

If last_sig_coeff_x_suffix is not present, then LastSignificantCoeffX=last_sig_coeff_x_prefix;

Otherwise (last_sig_coeff_x_suffix is present), LastSignificantCoeffX=$(1<<((last\_sig\_coeff\_x\_pre-fix>>1)-1))*(2+(last\_sig\_coeff\_x\_prefix\&1))+$ last_sig_coeff_x_suffix.

(d) last_sig_coeff_y_suffix specifies the suffix of the vertical (or row) coordinate of the last significant coefficient of the current transform block in scanning order. The value of last_sig_coeff_x_suffix shall be in the range of 0 to $(1<<((last\_sig\_coeff\_y\_prefix>>1)-1))-1$, inclusively.

LastSignificantCoeffY, i.e., the value of the vertical (or row) coordinate of the last significant coefficient of the current transform block in scanning order, is derived as follows:

If last_sig_coeff_y_suffix is not present, then LastSignificantCoeffY=last_sig_coeff_y_prefix;

Otherwise (last_sig_coeff_y_suffix is present), LastSignificantCoeffY=$(1<<((last\_sig\_coeff\_y\_pre-fix>>1)-1))*(2+(last\_sig\_coeff\_y\_prefix\&1))+$ last_sig_coeff_y_suffix.

Further, the last significant coefficient and the previous coefficients thereof need to be coded. However, in a common video, a certain percentage of these coefficients are still equal to 0. In VVC, a flag sb_coded_flag indicating whether a current sub-block is coded is used to determine whether the coefficients of the current sub-block need to be coded. If no coding is needed, then all the coefficients of the current sub-block are considered as 0. Here, the sub-block is typically an n×n sub-block, such as a 4×4 sub-block.

sb_coded_flag[xS][yS] specifies the following for the subblock at location (xS, yS) within the current transform block, where a subblock is an array of transform coefficient levels:

When sb_coded_flag[xS][yS] is equal to 0, all transform coefficient levels of the subblock at location (xS, yS) are inferred to be equal to 0.

When sb_coded_flag[xS][yS] is not present, it is inferred to be equal to 1.

Further, when dealing with coefficient coding, the compression efficiency can be improved by utilizing the properties of the coefficients. For example, for the common video, a certain percentage of the coefficients to-be-coded are 0. Thus, a syntax element may be used to indicate whether the current coefficient is 0. This syntax element is usually a binary symbol (bin). If the current coefficient is 0, then it means that coding of the current coefficient has ended. Otherwise, coding of the current coefficient needs to be continued. As another example, for the common video, a certain percentage of the significant coefficients have an absolute value of 1. Thus, a syntax element may be used to indicate whether an absolute value of a current coefficient is greater than 1. This syntax element is usually a bin. If the absolute value of the current coefficient is not greater than 1, then it means that coding of the current coefficient has ended. Otherwise, coding of the current coefficient needs to be continued. For example, the syntax element(s) involved in VVC is as follows.

sig_coeff_flag[xC][yC] specifies for the transform coefficient location (xC, yC) within the current transform block whether the corresponding transform coefficient level at the location (xC, yC) is non-zero as follows:

If sig_coeff_flag[xC][yC] is equal to 0, the transform coefficient level at the location (xC, yC) is set equal to 0;

Otherwise (sig_coeff_flag[xC][yC] is equal to 1), the transform coefficient level at the location (xC, yC) has a non-zero value.

When sig_coeff_flag[xC][yC] is not present, it is inferred as follows:

If transform_skip_flag[x0][y0][cIdx] is equal to 0 or sh_ts_residual_coding_disabled_flag is equal to 1, the following applies:

If (xC, yC) is the last significant location (LastSignificantCoeffX, LastSignificantCoeffY) in scanning order or all of the following conditions are true, sig_coeff_flag[xC][yC] is inferred to be equal to 1:

(xC & ((1<<log 2SbW)−1), yC & ((1<<log 2SbH)−1)) is equal to (0, 0);

inferSbDcSigCoeffFlag is equal to 1; and sb_coded_flag[xS][yS] is equal to 1;

Otherwise, sig_coeff_flag[xC][yC] is inferred to be equal to 0;

Otherwise (transform_skip_flag[x0][y0][cIdx] is equal to 1 and sh_ts_residual_coding_disabled_flag is equal to 0), the following applies:

If all of the following conditions are true, sig_coeff_flag[xC][yC] is inferred to be equal to 1:

(xC & ((1<<log 2SbW)−1), yC & ((1<<log 2SbH)−1)) is equal to ((1<<log 2SbW)−1, (1<<log 2SbH)−1);

inferSbSigCoeffFlag is equal to 1; and sb_coded_flag[xS][yS] is equal to 1;

Otherwise, sig_coeff_flag[xC][yC] is inferred to be equal to 0.

abs_level_gtx_flag[n][j] specifies whether the absolute value of the transform coefficient level (at scanning position n) is greater than (j<<1)+1. When abs_level_gtx_flag[n][j] is not present, abs_level_gtx_flag[n][j] is equal to 0.

In this way, if the coding of the current coefficient is not ended after the above flags (or called syntax elements) are processed, then a remaining value of an absolute value of the coefficient needs to be encoded, such as abs_remainder in VVC.

abs_remainder[n] is the remaining absolute value of a transform coefficient level that is coded with Golomb-Rice code at the scanning position n. When abs_remainder[n] is not present, abs_remainder[n] is equal to 0.

Further, in VVC, syntax elements such as sig_coeff_flag and abs_level_gtx_flag are coded using the context mode, while abs_remainder is coded using the bypass mode. As mentioned above, context mode coding is more complex than bypass mode coding, which intuitively means a lower processing speed. If there are a larger number of coefficients to be coded, heavy used of the context mode coding will affect the decoding speed. Therefore, the number of syntax elements coded using context mode may be limited. For example, if the number of bins coded using the context mode exceeds a threshold, subsequent coefficients are forced to be coded using the bypass mode. Such as dec_abs_level in VVC.

dec_abs_level[n] is an intermediate value that is coded with Golomb-Rice code at the scanning position n. ZeroPos[n] can be derived during the parsing of dec_abs_level[n], the absolute value of a transform coefficient level at location (xC, yC) AbsLevel[xC][yC] is derived as follows:

If dec_abs_level[n] is not present or equal to ZeroPos[n], AbsLevel[xC][yC] is set equal to 0.

Otherwise, if dec_abs_level[n] is less than ZeroPos[n], AbsLevel[xC][yC] is set equal to dec_abs_level[n]+1;

Otherwise (dec_abs_level[n] is greater than ZeroPos[n]), AbsLevel[xC][yC] is set equal to dec_abs_level[n].

The above values are the absolute values of the coefficients. The sign of a significant coefficient may be determined by using a coefficient sign flag coeff_sign_flag or some methods for sign derivation. coeff_sign_flag[n] may be used to determine the sign of a transform coefficient at a scanning position n as follows:

If coeff_sign_flag[n] is 0, then the corresponding transform coefficient is positive;

Otherwise (coeff_sign_flag[n] is 1), the corresponding transform coefficient is negative.

If coeff_sign_flag[n] is not present, then coeff_sign_flag[n] is 0. In this case, the sign of the transform coefficient on the coordinates (xC, yC) is determined from CoeffSignLevel[xC][yC]:

If CoeffSignLevel[xC][yC] is 0, then the corresponding transform coefficient is 0;

Otherwise, if CoeffSignLevel[xC][yC] is 1, then the corresponding transform coefficient is positive; otherwise (CoeffSignLevel[xC][yC] is −1), the corresponding transform coefficient is negative.

It should also be noted that CoeffSignLevel[xC][yC] may be derived using other methods, which will not be repeated herein.

In addition, VVC uses a parity flag par_level_flag for a coefficient value. The flag indicates the parity of the current coefficient and is used in determining the current coefficient value and in dependent quantization.

par_level_flag[n] specifies the parity of the transform coefficient level at the scanning position n. When par_level_flag[n] is not present, par_level_flag[n] is equal to 0.

In addition to determining the parity of the transform coefficient, par_level_flag may be further used to determine the value of the coefficient in conjunction with abs_level_gtx_flag, abs_remainder, etc.

Here, since context mode coding requires selecting, using, and updating context modes, whereas bypass mode encoding does not require, it is common practice to place the syntax elements coded in context mode together and the syntax elements coded in bypass mode together within a certain range, which is more friendly to the hardware design. For example, all the context mode-coded syntax elements in a block are processed first, and then the bypass mode-coded syntax elements are processed. All the context mode-coded syntax elements in the current block may be further divided into several groups, and all the bypass mode-coded syntax elements in the block may be further divided into several groups.

In one specific example, the specific syntax of RRC is illustrated in Table 1.

TABLE 1

| | Descriptor |
|---|---|
| residual_coding(x0,y0,log2TbWidth,log2TbHeight,cIdx){ | |
| if(sps_mts_enabled_flag && cu_sbt_flag && cIdx==0 && | |
|   log2TbWidth==5 && log2TbHeight<6) | |
|   log2ZoTbWidth=4 | |
| else | |
|   log2ZoTbWidth=Min(log2TbWidth,5) | |
| if(sps_mts_enabled_flag && cu_sbt_flag && cIdx==0 && | |
|   log2TbWidth<6 && log2TbHeight==5) | |
|   log2ZoTbHeight=4 | |
| else | |
|   log2ZoTbHeight=Min(log2TbHeight,5) | |
| if(log2TbWidth >0) | |
|   last_sig_coeff_x_prefix | ae(v) |
| if(log2TbHeight >0) | |
|   last_sig_coeff_y_prefix | ae(v) |

TABLE 1-continued

| | Descriptor |
|---|---|
| if(last_sig_coeff_x_prefix> 3) | |
|    last_sig_coeff_x_suffix | ae(v) |
| if(last_sig_coeff_y_prefix> 3) | |
|    last_sig_coeff_y_suffix | ae(v) |
| log2TbWidth=log2ZoTbWidth | |
| log2TbHeight=log2ZoTbHeight | |
| remBinsPass1=((1<<(log2TbWidth+log2TbHeight))×7)>>2 | |
| log2SbW=(Min(log2TbWidth,log2TbHeight)< 2 ?1: 2) | |
| log2SbH=log2SbW | |
| if(log2TbWidth+log2TbHeight>3) | |
|    if(log2TbWidth<2){ | |
|      log2SbW=log2TbWidth | |
|      log2SbH=4–log2SbW | |
|    } elseif(log2TbHeight<2){ | |
|      log2SbH=log2TbHeight | |
|      log2SbW=4–log2SbH | |
|    } | |
| numSbCoeff=1<<(log2SbW+log2SbH) | |
| lastScanPos=numSbCoeff | |
| lastSubBlock=(1<<(log2TbWidth+log2TbHeight–(log2SbW+log2SbH)))–1 | |
| do { | |
|    if(lastScanPos ==0){ | |
|      lastScanPos=numSbCoeff | |
|      lastSubBlock–– | |
|    } | |
|    lastScanPos–– | |
|    xS=DiagScanOrder[log2TbWidth–log2SbW][log2TbHeight–log2SbH] | |
|        [lastSubBlock][0] | |
|    yS=DiagScanOrder[log2TbWidth–log2SbW][log2TbHeight–log2SbH] | |
|        [lastSubBlock][1] | |
|   xC=(xS<<log2SbW)+DiagScanOrder[log2SbW][log2SbH][lastScanPos][0] | |
|   yC=(yS<<log2SbH)+DiagScanOrder[log2SbW][log2SbH][lastScanPos][1] | |
|    } while((xC != LastSignificantCoeffX) \|\| (yC != | |
| LastSignificantCoeffY)) | |
|    if(lastSubBlock ==0 && log2TbWidth>=2 && log2TbHeight>=2 && | |
|      !transform_skip_flag[x0][y0][cIdx] && lastScanPos >0) | |
|      LfnstDcOnly=0 | |
|    if((lastSubBlock >0 && log2TbWidth>=2 && log2TbHeight>=2) \|\| | |
|      (lastScanPos>7 && (log2TbWidth==2 \|log2TbWidth==3) && | |
|      log2TbWidth==log2TbHeight)) | |
|      LfnstZeroOutSigCoeffFlag=0 | |
|    if((lastSubBlock >0\| \|lastScanPos >0) && cIdx == 0) | |
|      MtsDcOnly=0 | |
|    QState=0 | |
|    for(i=lastSubBlock; i >=0; i––){ | |
|      startQStateSb=QState | |
|      xS=DiagScanOrder[log2TbWidth–log2SbW][log2TbHeight–log2SbH] | |
|         [i][0] | |
|      yS=DiagScanOrder[log2TbWidth–log2SbW][log2TbHeight–log2SbH] | |
|         [i][1] | |
|      inferSbDcSigCoeffFlag=0 | |
|      if(i<lastSubBlock && i >0){ | |
|        sb_coded_flag[xS][yS] | ae(v) |
|        inferSbDcSigCoeffFlag=1 | |
|      } | |
|      if(sb_coded_flag[xS][yS] && (xS>3\| \|yS>3) && cIdx==0) | |
|        MtsZeroOutSigCoeffFlag=0 | |
|    firstSigScanPosSb=numSbCoeff | |
|    lastSigScanPosSb=–1 | |
|    firstPosMode0=(i===lastSubBlock ? lastScanPos : numSbCoeff–1) | |
|    firstPosMode1=firstPosMode0 | |
|    for(n=firstPosMode0; n >=0 && remBinsPass1>=4; n––){ | |
|      xC=(xS<<log2SbW)+DiagScanOrder[log2SbW][log2SbH][n][0] | |
|      yC=(yS<<log2SbH)+DiagScanOrder[log2SbW][log2SbH][n][1] | |
|      if(sb_coded_flag[xS][yS] && (n >0\| \|!inferSbDcSigCoeffFlag) && | |
|       (xC != LastSignificantCoeffX \|\| yC != LastSignificantCoeffY)){ | |
|        sig_coeff_flag[xC][yC] | ae(v) |
|        remBinsPass1–– | |
|        if(sig_coeff_flag[xC][yC]) | |
|          inferSbDcSigCoeffFlag=0 | |
|      } | |
|      if(sig_coeff_flag[xC][yC]){ | |
|        abs_level_gtx_flag[n][0] | ae(v) |
|        remBinsPass1–– | |
|        if(abs_level_gtx_flag[n][0]){ | |
|          par_level_flag[n] | ae(v) |
|          remBinsPass1–– | |

TABLE 1-continued

|  | Descriptor |
|---|---|

```
        abs_level_gtx_flag[n][1]                                      ae(v)
        remBinsPass1--
      }
      if(lastSigScanPosSb == -1)
        lastSigScanPosSb=n
      firstSigScanPosSb=n
    }
    AbsLevelPass1[xC][yC]=sig_coeff_flag[xC][yC]+par_level_flag[n]+
      abs_level_gtx_flag[n][0]+2×abs_level gtx_flag[n][1]
    if(sh_dep_quant_used_flag)
      QState=QStateTransTable[QState][AbsLevelPass1[xC][yC]&1]
    firstPosModel=n-1
  }
  for(n=firstPosMode0; n>firstPosModel; n-- ){
    xC=(xS<<log2SbW)+DiagScanOrder[log2SbW][log2SbH][n][0]
    yC=(yS<<log2SbH)+DiagScanOrder[log2SbW][log2SbH][n][1]
    if(abs_level_gtx_flag[n][1])
      abs_remainder[n]                                                ae(v)
    AbsLevel[xC][yC]=AbsLevelPass1[xC][yC]+2×abs_remainder[n]
  }
  for(n=firstPosModel; n >=0; n-- ){
    xC=(xS<<log2SbW)+DiagScanOrder[log2SbW][log2SbH][n][0]
    yC=(yS<<log2SbH)+DiagScanOrder[log2SbW][log2SbH][n][1]
    if(sb_coded_flag[xS][yS])
      dec_abs_level[n]                                                ae(v)
    if(AbsLevel[xC][yC]>0){
    if(lastSigScanPosSb == -1)
        lastSigScanPosSb=n
      firstSigScanPosSb=n
    }
    if(sh_dep_quant_used_flag)
      QState=QStateTransTable[QState][AbsLevel[xC][yC]&1]
  }
  signHiddenFlag=sh_sign_data_hiding_used_flag &&
    (lastSigScanPosSb-firstSigScanPosSb>3 ?1:0)
  for(n=numSbCoeff-1; n >=0; n-- ){
    xC=(xS<<log2SbW)+DiagScanOrder[log2SbW][log2SbH][n][0]
    yC=(yS<<log2SbH)+DiagScanOrder[log2SbW][log2SbH][n][1]
    if((AbsLevel[xC][yC]>0) &&
    (!signHiddenFlag| |(n != firstSigScanPosSb))
      coeff_sign_flag[n]                                              ae(v)
  }
  if(sh_dep_quant_used_flag){
    QState=startQStateSb
    for(n=numSbCoeff-1; n >=0; n-- ){
      xC=(xS<<log2SbW)+DiagScanOrder[log2SbW][log2SbH][n][0]
      yC=(yS<<log2SbH)+DiagScanOrder[log2SbW][log2SbH][n][1]
      if(AbsLevel[xC][yC]>0)
        TransCoeffLevel[x0][y0][cIdx][xC][yC]=
          (2×AbsLevel[xC][yC]-(QState>1?1:0))×
          (1-2×coeff_sign_flag[n])
      QState=QStateTransTable[QState][AbsLevel[xC][yC]&1]
    }
  } else{
    sumAbsLevel=0
    for(n=numSbCoeff-1; n>=0; n-- ){
      xC=(xS<<log2SbW)+DiagScanOrder[log2SbW][log2SbH][n][0]
      yC=(yS<<log2SbH)+DiagScanOrder[log2SbW][log2SbH][n][1]
      if(AbsLevel[xC][yC]>0){
        TransCoeffLevel[x0][y0][cIdx][xC][yC] =
          AbsLevel[xC][yC]×(1-2×coeff_sign_flag[n])
        if(signHiddenFlag){
          sumAbsLevel += AbsLevel[xC][yC]
          if(n == firstSigScanPosSb && sumAbsLevel % 2 ==1)
          TransCoeffLevel[x0][y0][cIdx][xC][yC] =
              -TransCoeffLevel[x0][y0][cIdx][xC][yC]
        }
      }
    }
  }
}
}
```

The array AbsLevel[xC][yC] represents an array of absolute values of the transform coefficients of the current transform block. The array AbsLevelPass1[xC][yC] represents an array of the absolute values of the partial reconstruction of the transform coefficients of the current transform block. The indexes xC and yC of the array represent the position (xC, yC) in the current transform block.

After entering the function residual_coding (x0, y0, log 2TbWidth, log 2TbHeight, cIdx), it is necessary to determine some information about the block size, such as determining the logarithms log 2ZoTbWidth and log 2ZoTbHeight of the block size after zero-out, where coefficients with a horizontal coordinate in a range [0, (1<<log 2ZoTbWidth)–1] and a vertical coordinate in a range [0, (1<<log 2ZoTbHeight)–1] may be significant coefficients. Here, (1<<log 2ZoTbWidth) represents the width of the transform block after zero-out, and (1<<log 2ZoTbHeight) represents the height of the transform block after zero-out. Then the position of the last significant coefficient is determined based on last_sig_coeff_x_prefix, last_sig_coeff_y_prefix, last_sig_coeff_x_suffix, last_sig_coeff_y_suffix, and so on. The coefficients before (preceding) the last significant coefficient in scanning order may be significant coefficients. Then the value of remBinsPass1 is determined, i.e., determined using a remBinsPass1=((1<<(log 2TbWidth+log 2TbHeight))×7)>>2. remBinsPass1 specifies the number of syntax elements that are coded using the context mode in the current block. In the embodiments of the present disclosure, it may be understood that remBinsPass1 means remaining binaries inpass1, that is, the number of bins remaining in the first round. The coefficients before the last significant coefficient in scanning order need to be coded. For the sub-blocks containing these coefficients, it is determined whether each current sub-block needs to be coded, and if so, the method sets the syntax elements coded in context mode in a sub-block in the first round, and the syntax elements coded in bypass mode later. For each coefficient, it may need to process at most 4 context-mode coded syntax elements, i.e., one sig_coeff_flag, two abs_level_gtx_flag, and one par_level_flag. In the first round, remBinsPass1 is decremented by 1 each time a context-mode coded syntax element is processed. If a coefficient is large enough, the remaining value, i.e., abs_remainder, needs to be processed after the syntax elements coded in context mode in the first round are processed. If remBlinsPass1 is already small enough (does not satisfy remBlinsPass1>=4), the first round ends, and the remaining coefficients are processed directly in bypass mode, i.e., dec_abs_level.

In another specific example, the specific syntax of TSRC is illustrated in Table 2.

TABLE 2

| | Descriptor |
|---|---|
| residual_ts_coding(x0,y0,log2TbWidth,log2TbHeight, cIdx){ | |
|   log2SbW=(Min(log2TbWidth,log2TbHeight)< 2 ?1: 2) | |
|   log2SbH=log2SbW | |
|   if(log2TbWidth+log2TbHeight>3) | |
|     if(log2TbWidth<2){ | |
|       log2SbW=log2TbWidth | |
|       log2SbH=4–log2SbW | |
|     } elseif(log2TbHeight<2){ | |
|       log2SbH=log2TbHeight | |
|       log2SbW=4–log2SbH | |
|     } | |
|   numSbCoeff=1<<(log2SbW+log2SbH) | |
|   lastSubBlock=(1<<(log2TbWidth+log2TbHeight–(log2SbW+log2SbH)))– | |
| 1 | |
|   inferSbCbf=1 | |
|   RemCcbs=((1<<(log2TbWidth+log2TbHeight))×7)>>2 | |
|   for(i =0; i <= lastSubBlock; i++){ | |
|   xS=DiagScanOrder[log2TbWidth–log2SbW][log2TbHeight–log2SbH][i][0] | |
|   yS=DiagScanOrder[log2TbWidth–log2SbW][log2TbHeight–log2SbH][i][1] | |
|     if(i != lastSubBlock‖ !inferSbCbf) | |
|       sb_coded_flag[xS][yS] | ae(v) |
|     if(sb_coded_flag[xS][yS] && i<lastSubBlock) | |
|       inferSbCbf=0 | |
|     /×Firstscanpass ×/ | |
|     inferSbSigCoeffFlag=1 | |
|     lastScanPosPass1 =–1 | |
|     for(n=0; n <= numSbCoeff-1 && RemCcbs>=4; n++){ | |
|       xC=(xS<<log2SbW)+DiagScanOrder[log2SbW][log2SbH][n][0] | |
|       yC=(yS<<log2SbH)+DiagScanOrder[log2SbW][log2SbH][n][1] | |
|       lastScanPosPass1=n | |
|       if(sb_coded_flag[xS][yS] && | |
|         (n != numSbCoeff-1 !inferSbSigCoeffFlag)){ | |
|         sig_coeff_flag[xC][yC] | ae(v) |
|         RemCcbs–– | |
|         if(sig_coeff_flag[xC][yC]) | |
|           inferSbSigCoeffFlag–0 | |
|       } | |
|       CoeffSignLevel[xC][yC]=0 | |
|       if(sig_coeff_flag[xC][yC]){ | |
|         coeff_sign_flag[n] | ae(v) |
|         RemCcbs–– | |
|         CoeffSignLevel[xC][yC]=(coeff_sign_flag[n]>0 ?–1:1) | |
|         abs_level_gtx_flag[n][0] | ae(v) |
|         RemCcbs–– | |
|         if(abs_level_gtx_flag[n][0]){ | |
|           par_level_flag[n] | ae(v) |

TABLE 2-continued

Descriptor

```
        RemCcbs−−
      }
    }
  }
  AbsLevelPass1[xC][yC]=
    sig_coeff_flag[xC][yC]+par level flag[n]+abs level gtx flag[n][0]
}
/*Greater than Xscanpass(numGtXFlags=5)*/
  lastScanPosPass2 =−1
  for(n=0; n <= numSbCoeff−1 && RemCcbs>=4; n++){
    xC(xS<<log2SbW)+DiagScanOrder[log2SbW][log2SbH][n][0]
    yC=(yS<<log2SbH)+DiagScanOrder[log2SbW][log2SbH][n][1]
    AbsLevelPass2[xC][yC]=AbsLevelPass1[xC][yC]
    for(j=1; j<5; j++){
      if(abs_level_gtx_flag[n][j−1]){
        abs_level_gtx_flag[n][j]                                        ae(v)
        RemCcbs−−
      }
      AbsLevelPass2[xC][yC] += 2×abs_level_gtx_flag[n][j]
    }
    lastScanPosPass2=n
  }
/*remainderscanpass */
  for(n=0; n <= numSbCoeff−1; n++){
    xC=(xS<<log2SbW)+DiagScanOrder[log2SbW][log2SbH][n][0]
    yC=(yS<<log2SbH)+DiagScanOrder[log2SbW][log2SbH][n][1]
    if((n <= lastScanPosPass2 && AbsLevelPass2[xC][yC]>=10) | |
      (n>lastScanPosPass2 && n <= lastScanPosPass1 &&
      AbsLevelPass1[xC][yC]>= 2) | |
      (n>lastScanPosPass1 && sb_coded_flag[xS][yS]))
        abs_remainder[n]                                               ae(v)
    if(n <= lastScanPosPass2)
      AbsLevel[xC][yC]=AbsLevelPass2[xC][yC]+2×abs_remainder[n]
    elseif(n <= lastScanPosPass1)
      AbsLevel[xC][yC]=AbsLevelPass1[xC][yC]+2×abs_remainder[n]
    else{ /*bypass */
      AbsLevel[xC][yC]=abs_remainder[n]
      if(abs_remainder[n])
        coeff_sign_flag[n]                                             ae(v)
    }
    if(BdpcmFlag[x0][y0][cIdx] ==0 && n <= lastScanPosPass1){
      absLeftCoeff=xC >0 ? AbsLevel[xC−1][yC]:0
      absAboveCoeff =yC >0 ? AbsLevel[xC][yC−1]:0
      predCoeff=Max(absLeftCoeff,absAboveCoeff)
      if(AbsLevel[xC][yC]==1 && predCoeff >0)
        AbsLevel[xC][yC]=predCoeff
      elseif(AbsLevel[xC][yC]>0 && AbsLevel[xC][yC] <= predCoeff)
        AbsLevel[xC][yC]−−
    }
    TransCoeffLevel[x0][y0][cIdx][xC][yC]=(1−2×coeff_sign_flag[n])×
      AbsLevel[xC][yC]
  }
 }
}
```

After entering the function residual_ts_coding (x0, y0, log 2TbWidth, log 2TbHeight, cIdx), some information about the block size needs to be determined. The value of RemCcbs is then determined using the equation RemCcbs= ((1<<(log 2TbWidth+log 2TbHeight))×7)>>2. RemCcbs specifies the number of syntax elements in the current block that are coded using the context mode. In the embodiments of the present disclosure, it may be understood that RemCcbs means remaining context coded binaries That is, the number of remaining context mode coded bins. For each sub-block, it is determined whether the current sub-block requires to be coded. If coding is required, different from the RRC described above, the TSRC method sets the syntax elements coded in the context mode in a sub-block in two rounds, with up to four context-mode coded syntax elements are processed for each coefficient in the first and second rounds, respectively. The syntax elements coded in bypass mode are set later. In the first and second rounds, RemCcbs is decremented by 1 each time a context-mode coded syntax element is processed. If a coefficient is large enough, the remaining value, i.e., abs_remainder, needs to be processed after the context-mode coded syntax elements have been processed in the first and second rounds. If RemCcbs is small enough (does not satisfy RemCcbs>=4), the first two rounds will be ended and the remaining coefficients will be processed directly in bypass mode, in this case still abs_remainder.

The current coefficient coding method available in the related art has good compression efficiency for videos that are commonly used today, such as consumer videos. Consumer video usually has a bit depth of 8 or 10 bits per pixel, and the bitrate is usually not too high, usually a few megabits per second (MB/s) or less. However, there are some applications where the video requires a higher bit depth, such as 12, 14, or 16 bits per pixel or higher. The higher bit depth usually results in larger coefficients, and thus higher bitrate.

There are also applications where the video requires higher quality, which usually results in larger coefficients, and thus higher bitrate. The higher bitrate requires stronger processing power, such as throughput, of the decoder.

High bit depth, high quality, and high bitrate video (referred to as "triple-high video") usually requires more and larger coefficients to be coded than low bit depth, low quality, and low bitrate video (referred to as "conventional video"). For example, the number of coefficients that need to be coded for a block in the triple-high video is much larger than that for a block of the same size in the conventional video. This is because for the conventional video, many of the coefficients in a block after prediction, transformation, and quantization become 0, while for the triple-height video, many of the coefficients in a block after prediction, transformation, and quantization are still significant coefficients. A certain percentage of the coefficients to-be-coded after prediction, transformation and quantization in the block of conventional video are 0, and a large percentage of the non-0 coefficients are very small coefficients, such as the absolute value of which is 1 or 2 or 3. Many coefficients to-be-coded after prediction, transformation, quantization in the block of triple-high video have larger value, and coefficient being equal to 0 or having the absolute value of 1, 2, 3 is a very small proportion. Therefore, the existing syntax elements that specifies whether the current coefficients are significant coefficients, whether the absolute value of the current coefficient is greater than 1 or greater than 2, etc., will not improve the compression efficiency of the triple-high video. On the other hand, since all these syntax elements are coded using the context mode, the processing in the context mode is more complicated than that in the bypass mode, i.e., more cost is paid without getting positive effect.

Another possibility is to use this method in lossless compression, where quantization cannot be used and the coefficients are usually large.

That is, the current design of CABAC utilizes the coefficient distribution pattern in common video, however, for some coding scenarios where the coefficient distribution pattern is different from that of common video, such as video with high bit-depth, high bit-rate, high-quality video, etc., the existing CABAC has the defect of high complexity, which reduces compression efficiency To solve the above problem, when coding the coefficients, based on the context mode flag, the coder may choose whether to code the coefficients of the current block using the context mode or may perform adjustment of the initial value of the quantity parameter, thereby improving the throughput of coefficient coding and the speed of coding, reducing complexity, and implementing the simple and efficient coding method by reducing the number of syntax elements and even eliminating syntax elements for context mode coding in the process of coding the coefficients, thus improving compression performance.

Figure 8:
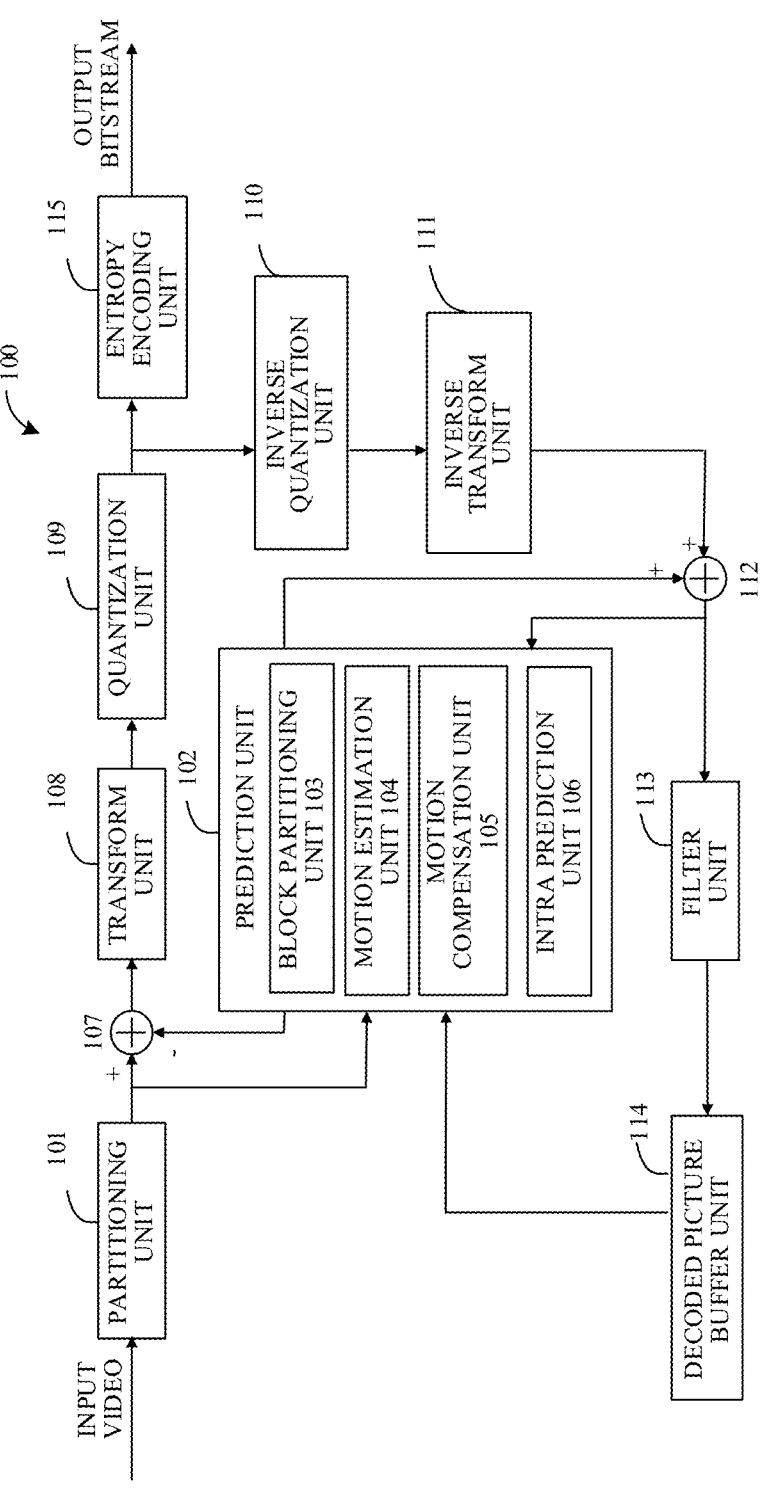
FIG. 8 is a schematic diagram of a system composition of an encoder provided in embodiments of the disclosure.

Referring to FIG. 8, FIG. 8 illustrates an example block diagram of a system composition of an encoder provided in embodiments of the present disclosure. As illustrated in FIG. 8, the encoder 100 may include a partitioning unit 101, a prediction unit 102, a first adder 107, a transform unit 108, a quantization unit 109, an inverse quantization unit 110, an inverse transform unit 111, a second adder 112, a filter unit 113, a decoded picture buffer (DPB) unit 114, and an entropy encoding unit 115. Here, an input to the encoder 100 may be a video including a series of pictures or a still picture, and an output of the encoder 100 may be a bitstream representing a compressed version of the input video.

The partitioning unit 101 partitions a picture in the input video into one or more coding tree units (CTUs). The partitioning unit 101 partitions the picture into multiple tiles, and may further partition one tile into one or more bricks, where a tile or a brick may include one or more complete and/or partial CTUs. In addition, the partitioning unit 101 may generate one or more slices, where one slice may include one or more tiles in a raster order in the picture, or one or more tiles covering a rectangular region in the picture. The partitioning unit 101 may also generate one or more sub-pictures, where one sub-picture may include one or more slices, tiles, or bricks.

During the encoding process of the encoder 100, the partitioning unit 101 passes the CTUs to the prediction unit 102. Typically, the prediction unit 102 may include a block partitioning unit 103, a motion estimation (ME) unit 104, a motion compensation (MC) unit 105, and an intra prediction unit 106. Specifically, the block partitioning unit 103 further partitions the input CTU into smaller coding units (CUs) by iteratively using quad tree partitioning, binary tree partitioning, and triple tree partitioning. The prediction unit 102 may use the ME unit 104 and the MC unit 105 to obtain an inter prediction block of the CU. The intra prediction unit 106 may obtain an intra prediction block of the CU using various intra prediction modes including the MIP mode. In examples, the rate-distortion optimization (RDO)-based motion estimation method may be invoked by the ME unit 104 and the MC unit 105 to obtain the inter prediction block, and the RDO-based mode determination method may be invoked by the intra prediction unit 106 to obtain the intra prediction block.

The prediction unit 102 outputs the prediction block of the CU, and the first adder 107 calculates a difference, i.e., a residual CU, between the CU output by the partitioning unit 101 and the prediction block of the CU. The transform unit 108 reads the residual CU and performs one or more transformations on the residual CU to obtain coefficients. The quantization unit 109 quantizes the coefficients and outputs quantized coefficients (i.e., levels). The inverse quantization unit 110 performs scaling operations on the quantized coefficients to output reconstructed coefficients. The inverse transform unit 111 performs one or more inverse transformations corresponding to the transformations in the transform unit 108 and outputs reconstructed residuals. The second adder 112 calculates a reconstructed CU by summing the reconstructed residuals and the prediction block of the CU from the prediction unit 102. The second adder 112 also passes its output to the prediction unit 102 to be used as a reference for intra prediction. After all CUs in the picture or sub-picture have been reconstructed, the filter unit 113 performs loop filtering on the reconstructed picture or sub-picture. Here, the filter unit 113 includes one or more filters, such as a de-blocking filter, a sample adaptive offset (SAO) filter, an adaptive loop filter (ALF), a luma mapping with chroma scaling (LMCS) filter, a neural network-based filter, and the like. Alternatively, if the filter unit 113 determines that the CU is not to be used as a reference for coding of other CUs, the filter unit 113 performs loop filtering on one or more target pixels in the CU.

The output of the filter unit 113 is decoded pictures or sub-pictures that are buffered into the DPB unit 114. The DPB unit 114 outputs the decoded pictures or sub-pictures based on timing and control information. Here, the pictures stored in the DPB unit 114 may also be used as a reference for the prediction unit 102 to perform inter prediction or intra prediction. Finally, the entropy encoding unit 115 converts the parameters necessary for decoding the pictures (e.g., control parameters and supplementary information, etc.) from the encoder 100 to the binary form and signals such binary form into the bitstream according to the syntax structure of each data unit, i.e., the encoder 100 finally outputs the bitstream.

Further, the encoder 100 may include a first processor and a first memory that records a computer program. When the first processor reads and runs the computer program, the encoder 100 reads the input video and generates a corresponding bitstream. Alternatively, the encoder 100 may be a computing device having one or more chips. These units implemented as integrated circuits on a chip have connectivity and data exchange functions similar to the corresponding units in FIG. 8.

Figure 9:
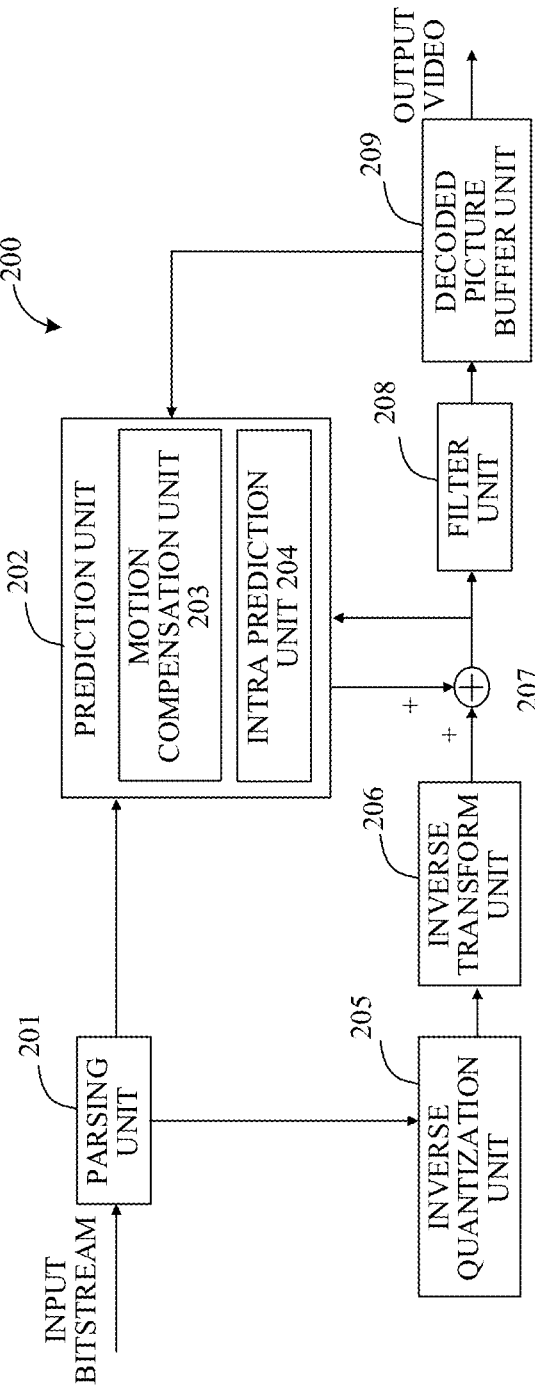
FIG. 9 is a schematic diagram of a system composition of a decoder provided in embodiments of the disclosure.

Referring to FIG. 9, FIG. 9 illustrates an example block diagram of a system composition of a decoder provided in embodiments of the present disclosure. As illustrated in FIG. 9, the decoder 200 may include a parsing unit 201, a prediction unit 202, an inverse quantization unit 205, an inverse transform unit 206, an adder 207, a filter unit 208, and a DPB unit 209. Here, the input to the decoder 200 is a bitstream representing a compressed version of a video or a still picture, and the output of the decoder 200 may be a bitstream including a decoded video including a series of pictures or a decoded still picture.

The input bitstream of the decoder 200 may be a bitstream generated by the encoder 100. The parsing unit 201 parses the input bitstream and obtains values of syntax elements from the input bitstream. The parsing unit 201 converts the binary representation of the syntax element into a numeric value and sends the numeric value to a unit in the decoder 200 to obtain one or more decoded pictures. The parsing unit 201 may also parse the one or more syntax elements from the input bitstream to display the decoded picture.

During the decoding process of the decoder 200, the parsing unit 201 sends to the unit in the decoder 200 the values of the syntax elements and one or more variables set or determined according to the values of the syntax elements for obtaining one or more decoded pictures.

The prediction unit 202 determines a prediction block for a current decoding block (e.g., CU). Here, the prediction unit 202 may include a motion compensation unit 203 and an intra prediction unit 204. Specifically, when the inter decoding mode is indicated for decoding the current decoding block, the prediction unit 202 passes related parameters from the parsing unit 201 to the motion compensation unit 203 to obtain an inter prediction block. When the intra prediction mode (including a MIP mode indicated by an MIP index value) is indicated for decoding the current decoding block, the prediction unit 202 passes related parameters from the parsing unit 201 to the intra prediction unit 204 to obtain an intra prediction block.

The inverse quantization unit 205 has the same function as the inverse quantization unit 110 in the encoder 100. The inverse quantization unit 205 performs scaling operations on the quantization coefficients (i.e., levels) from the parsing unit 201 to obtain reconstructed coefficients.

The inverse transform unit 206 has the same function as the inverse transform unit 111 in the encoder 100. The inverse transform unit 206 performs one or more transformations (i.e., inverse operations of one or more transformations performed by the inverse transform unit 111 in the encoder 100) to obtain reconstructed residuals.

The adder 207 performs a summing operation on its inputs (the prediction block from the prediction unit 202 and the reconstructed residuals from the inverse transform unit 206) to obtain a reconstructed block of the current decoding block. The reconstructed block is also sent to the prediction unit 202 to be used as a reference for other blocks coded in the intra prediction mode.

After all CUs in the picture or sub-picture have been reconstructed, the filter unit 208 performs loop filtering on the reconstructed picture or sub-picture. The filter unit 208 includes one or more filters, such as de-blocking filters, sampling adaptive compensation filters, adaptive loop filters, luminance mapping and chroma scaling filters, and neural network based filters. Alternatively, when the filter unit 208 determines that the reconstructed block is not to be used as a reference for decoding other blocks, the filter unit 208 performs loop filtering on one or more target pixels in the reconstructed block. Here, the output of the filter unit 208 is a decoded picture or sub-picture, and the decoded picture or sub-picture is buffered into the DPB unit 209. The DPB unit 209 outputs the decoded picture or sub-picture based on timing and control information. The picture stored in the DPB unit 209 may also be used as a reference for performing inter prediction or intra prediction by the prediction unit 202.

Further, the decoder 200 may include a second processor and a second memory that records a computer program. When the first processor reads and runs the computer program, the decoder 200 reads the input bitstream and generates a corresponding decoded video. Alternatively, the decoder 200 may be a computing device having one or more chips. These units implemented as integrated circuits on a chip have connectivity and data exchange functions similar to the corresponding units in FIG. 9.

It may also to be noted that when the embodiments of the present disclosure are applied to the encoder 100, a "current block" specifically refers to the current block to-be-encoded in the video picture (which may also be referred to as an "encoding block"). When the embodiments of the present disclosure are applied to the decoder 200, the "current block" specifically refers to the current block to-be-decoded in the video picture (which may also be referred to as a "decoding block").

Based on FIG. 8, the encoding method in the embodiments of the present disclosure is mainly applied to the "entropy encoding unit 115" in the encoder 100. The entropy encoding unit 115 may perform entropy encoding on a relevant flag (or a syntax element) in a context-mode-based adaptive binary arithmetic coding mode or a bypass mode and then signal into a bitstream.

Based on FIG. 9, the decoding method in the embodiments of the present disclosure is mainly applied to the "parsing unit 201" in the decoder 200. The parsing unit 201 may perform decoding in the context-mode-based adaptive binary arithmetic coding mode or the bypass mode to obtain the value of the relevant flag (or the syntax element), thus reconstructing coefficients.

The technical solution in the embodiments of the present disclosure is clearly and completely described as follows with reference to the accompanying drawings in the embodiments of the present disclosure.

Figure 10:
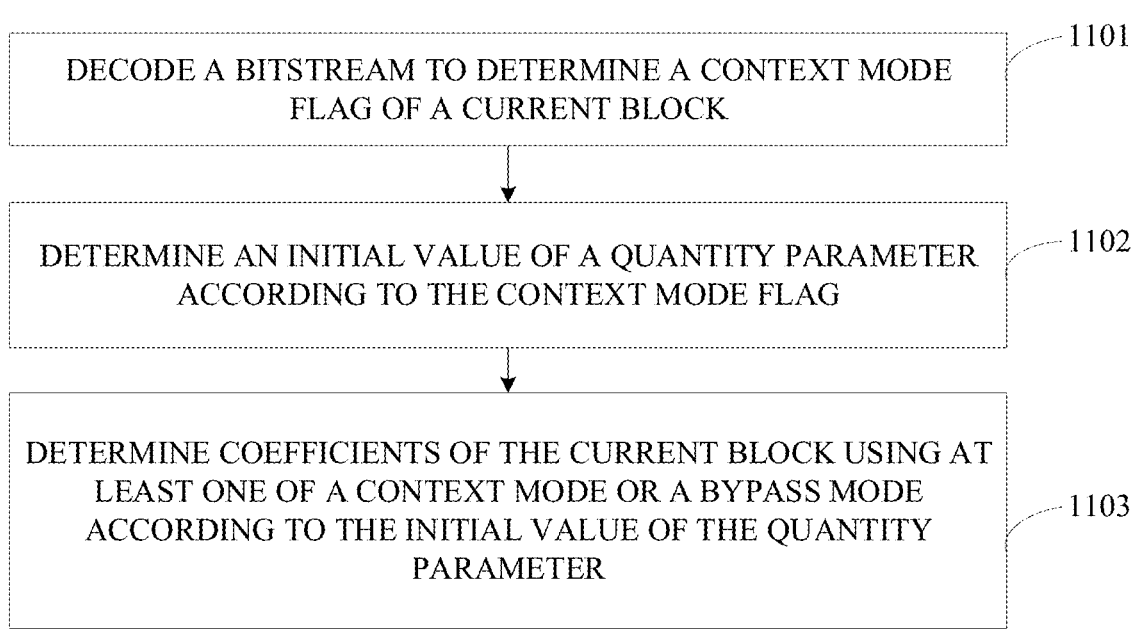
FIG. 10 is a schematic implementation flowchart of a decoding method.

Embodiments of the present disclosure provide a decoding method that is applied to a decoder. FIG. 10 is a schematic implementation flowchart of a decoding method. As illustrated in FIG. 10, the decoding method performed by the decoder may include the following operations.

At operation 1101, a bitstream is decoded to determine a context mode flag of a current block.

In the embodiments of the present disclosure, the decoder may determine the context mode flag of the current block through decoding the bitstream.

It may be noted that, in the embodiments of the present disclosure, the context mode flag may be used to determine an initial value of a quantity parameter.

The initial value of the quantity parameter indicates a maximum number of syntax elements which can be coded in the context mode. Specifically, the quantity parameter may be a parameter indicating the number of remaining syntax elements coded in the context mode available for the current block. The initial value of the quantity parameter is an initially configured value of the quantity parameter.

Further, in embodiments of the present disclosure, the context mode flag may be considered as a flag indicating that coefficients of the current block are determined in the context mode, or the context mode flag may be considered as a flag indicating that values of the coefficients of the current block are determined in the context mode. Specifically, by decoding the bitstream, the decoder may determine a variable as the context mode flag and then determine the context mode flag according to a value of the variable.

It may be noted that, in the present disclosure, the value of the context mode flag may be a first value or a second value. Specifically, the initial value of the quantity parameter is determined differently depending on the value of the context mode flag.

Exemplarily, in the present disclosure, the first value may be set as 1 and the second value may be set as 0, or the first value may be set as true and the second value may be set as false. The present disclosure is not limited hereto.

Exemplarily, in the present disclosure, if the context mode flag is used to determine whether the context mode is used to determine coefficients of the current block (or values of the coefficients of the current block) or not, then the context mode flag may be represented by a flag context_coded_level_bins_disabled_flag.

Specifically, in the present disclosure, if the value of context_coded_level_bins_disabled_flag is 1, then it may indicate that the context mode is not used to determine coefficients of the current block (or the values of the coefficients of the current block). If the value of context_coded_level_bins_disabled_flag is 0, then it may indicate that the context mode is used to determine coefficients of the current block (or the values of coefficients of the current block).

Further, in embodiments of the present disclosure, the context mode flag may be considered as a flag indicating that the initial value of the quantity parameter is reduced. Specifically, by decoding the bitstream, the decoder may determine a variable as the context mode flag and then determine the context mode flag according to a value of the variable.

Exemplarily, in the present disclosure, if the context mode flag is used to determine whether the initial value of the quantity parameter is reduced for the current block, the context mode flag may be represented by a flag context_coded_level_bins_reduced_flag.

Specifically, in the present disclosure, if the value of context_coded_level_bins_reduced_flag is 1, then it may indicate that the initial value of the quantity parameter is reduced. If the value of context_coded_level_bins_reduced_flag is 0, then it may indicate that the initial value of the quantity parameter is not reduced.

Further, in the present disclosure, the current block may be a picture block that is not transformed or a transform block that has been transformed. For example, the current block may be a zero-out transform block.

It may be noted that, in the present disclosure, the decoder may further determine a height parameter and a width parameter of the current block. Specifically, the height parameter and the width parameter of the current block may be used to determine a size of the current block.

Exemplarily, in the present disclosure, for the zero-out current block, after the logarithms log 2ZoTbWidth and log 2ZoTbHeight of the size of the current block are determined, (1<<log 2ZoTbHeight) may be used to represent the corresponding height parameter, and (1<<log 2ZoTbWidth) may be used to represent the corresponding width parameter.

Further, in embodiments of the present disclosure, the decoder may further decode the bitstream to determine a video flag. If the video flag indicates that the video satisfies a preset condition, then a process for determining the context mode flag may be performed.

It may be noted that, in embodiments of the present disclosure, the preset condition includes at least one of the following conditions: high bit depth, high quality, high bitrate, high frame rate, or lossless compression.

It may be understood that, in the present disclosure, for the conventional video, the method for decoding coefficients is the same as the existing method in the related art. However, for a certain case, such as unconventional videos with high bit depth, high quality, high bitrate, high frame rate, or lossless compression, the embodiments of the present disclosure may introduce a process for determining the context mode flag during coefficients decoding.

That is to say, compared with the conventional video, the unconventional video has higher bit depth, higher quality, higher bitrate, and higher frame rate, and the unconventional video is lossless compressed.

Further, in the embodiments of the present disclosure, it may be first determined whether the current video is a conventional video, which may be represented by the video flag. Specifically, if the value of the video flag is the first value, then the video flag indicates that the video satisfies the preset condition, which means that the video is an unconventional video. If the value of the video flag is the second value, then the video flag indicates that the video does not satisfy the preset condition, which means that the video is a conventional video.

Exemplarily, in the present disclosure, the first value may be set as 1 and the second value may be set as 2, or the first value may be set as true and the second value may be set as false. The present disclosure is not limited hereto.

Further, in the present disclosure, the video flag may be a sequence-level flag or even a higher level flag, such as video usability information (VUI), supplemental enhancement information (SEI), etc. Whether the video satisfies the preset condition may be determined by determining whether the video satisfies high bit depth, or whether the video satisfies high bitrate, or whether the video satisfies high quality, or whether the video satisfies lossless compression, etc. The following describes each of these four cases as examples.

Optionally, in the present disclosure, when the video flag is a high-bit-depth sequence flag, if the video satisfies high bit depth, it is determined that the high-bit-depth sequence flag indicates that the video satisfies the preset condition.

Optionally, in the present disclosure, when the video flag is a high-bitrate sequence flag, if the video satisfies high bitrate, it is determined that the high-bitrate sequence flag indicates that the video satisfies the preset condition.

Optionally, in the present disclosure, when the video flag is a high-quality sequence flag, if the video satisfies high quality, it is determined that the high-quality sequence flag indicates that the video satisfies the preset condition.

Optionally, in the present disclosure, when the video flag is a high-frame-rate sequence flag, if the video satisfies high frame rate, it is determined that the high-frame-rate sequence flag indicates that the video satisfies the preset condition.

Optionally, in the present disclosure, when the video flag is a lossless-compression sequence flag, if the video satisfies lossless compression, it is determined that the lossless-compression sequence flag indicates that the video satisfies the preset condition.

That is to say, in the present disclosure, the video flag may be the high-bit-depth sequence flag (represented by sps_high_bit_depth_flag) for indicating whether a current video is a high-bit-depth sequence. The video flag may also be the high-bitrate sequence flag (represented by sps_high_bit_rate_flag) for indicating whether a current video is a high-bitrate sequence. The video flag may also be another flag indicating high bit depth, high bitrate, high quality, high frame rate, or lossless compression, which is not specifically limited in the embodiments of the present disclosure.

It can be seen that, in the present disclosure, the determination of the context mode flag may depend on the determination of the video flag. That is to say, context_coded_level_bins_disabled_flag or context_coded_level_bins_reduced_flag may depend on some other flags such as a high-bit-depth flag or a high-bitrate flag.

Exemplarily, in the present disclosure, when the value of the high-bit-depth flag or the high-bitrate flag is 1, the flag context_coded_level_bins_disabled_flag or context_coded_level_bins_reduced_flag needs to be decoded. When the value of the high-bit-depth flag or the high-bitrate flag is not 1, the flag context_coded_level_bins_disabled_flag or context_coded_level_bins_reduced_flag does not need to be decoded.

It may be noted that, in the embodiments of the present disclosure, the context mode flag (context_coded_level_bins_disabled_flag or context_coded_level_bins_reduced_flag) may be a sequence-level flag, a picture-level flag, a slice-level flag, a block-level flag, or the like. The block-level flag includes a flag of an LCU level, a CU level, or other block levels. context_coded_level_bins_disabled_flag or context_coded_level_bins_reduced_flag may also be a flag of a higher level, such as VUI, SEI, etc.

It may be noted that, coefficient coding commonly referred to in video standards may include two parts: encoding and decoding. Therefore, the coefficient coding includes a coefficient encoding method at an encoder side and a coefficient decoding method at a decoder side. The embodiments of the present disclosure describe the coefficient decoding method at the decoder side.

At operation 1102, an initial value of a quantity parameter is determined according to the context mode flag.

In the embodiments of the disclosure, after determining the context mode flag of the current block, the decoder may further determine the initial value of the quantity parameter according to the context mode flag.

It can be understood that, in embodiments of the present disclosure, the initial value of the quantity parameter indicates a maximum number of syntax elements which can be coded in the context mode. Specifically, the quantity parameter may indicate the number of remaining syntax elements coded in the context mode available for the current block. The initial value of the quantity parameter is an initially configured value of the quantity parameter.

That is to say, in the present disclosure, the quantity parameter may be considered as a parameter indicating the number of syntax elements decoded in the context mode in the current block.

Further, in the present disclosure, the parameter value of the quantity parameter set before entering the decoding stage for syntax elements is the initial value of the quantity parameter.

Exemplarily, based on the above Table 1, for RRC, flag remBinsPass1 may be used to represent the quantity parameter of the syntax element, and then the initial value of remBinsPass1 set before coding the syntax elements is the initial value of the quantity parameter.

Exemplarily, based on the above Table 2, for TSRC, flag RemCcbs may be used to represent the quantity parameter, and then the initial value of RemCcbs set before coding the syntax elements is the initial value of the quantity parameter.

Further, in embodiments of the present disclosure, when the initial value of the quantity parameter is determined according to the context mode flag, if the value of the context mode flag is the first value, then the initial value of the quantity parameter may be determined as a first quantity value. If the value of the context mode flag is the second value, then the initial value of the quantity parameter may be determined according to the height parameter and the width parameter of the current block.

The first quantity value is an integer greater than or equal to 0 and less than a quantity threshold. For example, if the quantity threshold is 4, then the first quantity value may be set as 0, 1, 2 or 3.

It may be noted that, in the present disclosure, based on the above Table 1, for any one coefficient, a maximum of 4 syntax elements decoded in the context mode may need to be processed. Therefore, the syntax elements decoded in the context-mode can be processed only when remBinsPass1>=4 is true That is to say, the syntax element decoded in the context-mode is not processed when remBinsPass1<4.

Accordingly, in the present disclosure, if the value of the context mode flag is the first value, then the initial value of the quantity parameter may be determined as the first quantity value, such that remBinsPass1>=4 is not true, and then the syntax element decoded in the context mode is not processed. If the value of the context mode flag is the second value, then a common method in which the initial value of the quantity parameter is determined according to the height parameter and the width parameter, may still be used. For example, based on the above Table 1, set remBinsPass1= ((1<<(log 2TbWidth+log 2TbHeight))×7)>>2.

That is to say, in the present disclosure, based on the above Table 1, for RRC, if the context mode flag is used to determine whether the context mode is used to determine coefficients of the current block (or the values of coefficients of the current block), and context_coded_level_bins_disabled_flag is used to represent the context mode flag, then for determining the initial value remBinsPass1 of the quantity parameter according to the context mode flag, statement remBinsPass1=((1<<(log    2TbWidth+log    2TbHeight))× 7)>>2 in the above Table 1 may be replaced with the conditional statement illustrated in the following Table 3.

TABLE 3

```
if(context_coded_level_bins_disabled_flag){
    remBinsPass1=0
}else{
    remBinsPass1=((1<<(log2TbWidth+log2TbHeight))×7)>>2
}
```

It can be seen that after the context mode flag context_coded_level_bins_disabled_flag of the current block is determined by decoding the bitstream, if context_coded_level_bins_disabled_flag is not 0, then set remBins-Pass1=0 (or 1, or 2, or 3), such that remBinsPass1>=4 is not true and thus the syntax element decoded in the context mode is not processed. If context_coded_level_bins_disabled_flag is 0, the method for setting the initial value of remBinsPass1 may be the same as that in the above Table 1, namely set remBinsPass1=((1<<(log 2TbWidth+log 2TbHeight))×7)>>2.

It may be noted that, in the present disclosure, based on the above Table 2, the TSRC method sets the syntax elements decoded in the context mode in two rounds. For any one coefficient, a maximum of 4 syntax elements decoded in the context mode may be processed in each of the first and second rounds. Therefore, only when RemCcbs>=4 is true can the syntax elements decoded in the context mode be processed in the first or second round. That is, the syntax element decoded in the context mode will not be processed when RemCcbs<4.

Accordingly, in the present disclosure, if the value of the context mode flag is the first value, then the initial value of the quantity parameter may be determined directly as the first quantity value, such that RemCcbs>=4 is not true and thus the syntax element decoded in the context mode is not processed. If the value of the context mode flag is the second value, then a common method in which the initial value of the quantity parameter is determined according to the height parameter and the width parameter, may still be used. For example, based on the above Table 2, set RemCcbs=((1<< (log 2TbWidth+log 2TbHeight))×7)>>2.

That is to say, in the present disclosure, based on the above Table 2, for TSRC, if the context mode flag is used to determine whether the context mode is used to determine the coefficients of the current block (or the values of coefficients of the current block), and the flag context_coded_level_bins_disabled_flag is used to represent the context mode flag, then when determining the initial value RemCcbs of the quantity parameter according to the context mode flag, statement RemCcbs=((1<<(log 2TbWidth+log 2TbHeight))×7)>>2 in the above Table 2 may be replaced with a conditional statement illustrated in the following Table 4.

TABLE 4

```
if(context_coded_level_bins_disabled_flag){
    RemCcbs=0
}else{
    RemCcbs=((1<<(log2TbWidth+log2TbHeight))×7)>>2
}
```

It can be seen that after the context mode flag context_coded_level_bins_disabled_flag of the current block is determined by decoding the bitstream, if context_coded_level_bins_disabled_flag is not 0, then set RemCcbs=0 (or 1, or 2, or 3), such that RemCcbs>=4 is not true and thus the syntax element decoded in the context mode is not processed. If context_coded_level_bins_disabled_flag is 0, the method for setting the initial value of RemCcbs may be the same as that in the above Table 2, namely set RemCcbs=((1<<(log 2TbWidth+log 2TbHeight))×7)>>2.

Further, in the present disclosure, if the context mode flag is used to determine whether the initial value of the quantity parameter is reduced, then when determining the initial value of the quantity parameter according to the context mode flag, if the value of the context mode flag is the first value, the initial value of the quantity parameter may be determined as the second quantity value. If the value of the context mode flag is the second value, the initial value of the quantity parameter may be determined according to the height parameter and the width parameter.

It may be noted that, in the embodiments of the present disclosure, the second quantity value may be used to reduce the initial value of the quantity parameter. Specifically, the second quantity value may be smaller than the initial value of the quantity parameter which is determined according to the height parameter and the width parameter.

Optionally, in the present disclosure, if the context mode flag is used to determine whether the initial value of the quantity parameter is reduced, then when determining the initial value of the quantity parameter according to the context mode flag, if the value of the context mode flag is the first value, the initial value of the quantity parameter may be determined according to the height parameter, the width parameter, and a first shift parameter. If the value of the context mode flag is the second value, the initial value of the quantity parameter may then be determined according to the height parameter, the width parameter, and a second shift parameter.

It may be noted that, in the embodiments of the present disclosure, the first shift parameter and the second shift parameter may be used for right shifting. The first shift parameter is greater than the second shift parameter. That is to say, when other conditions are the same, after being right-shifted according to the first shift parameter and the second shift parameter respectively, the initial value of the quantity parameter corresponding to the first shift parameter is less than the initial value of the quantity parameter corresponding to the second shift parameter.

As can be seen, in the present disclosure, if the value of the context mode flag is the first value, then whether to determine the value of the initial value of the quantity parameter as a fixed value (the second quantity value), or to increase the number of right-shifting bits for calculating the initial value of the quantity parameter (the original first shift parameter is adjusted to be the second shift parameter), the ultimate purpose is to reduce the initial value of the quantity parameter, that is, to reduce the initial value of the quantity parameter is to reduce the number of syntax elements decoded in the context mode.

It may be noted that, in the present disclosure, based on the above Table 1, for any one coefficient, a maximum of 4 syntax elements decoded in the context mode may need to be processed. Therefore, the syntax elements decoded in the context mode may be processed only when remBinsPass1>=4 is true. That is, when remBinsPass1<4, the syntax element decoded in the context mode is not processed.

Accordingly, in the present disclosure, if the value of the context mode flag is the first value, then the initial value of the quantity parameter may be directly determined as a fixed value. For example, remBinsPass1 is set to the second quantity value, or the initial value of the quantity parameter is determined as remBinsPass1=((1<<(log 2TbWidth+log 2TbHeight))×7)>>4 (i.e. the first shift parameter is 4), thereby reducing the number of syntax elements decoded in the context mode. If the value of the context mode flag is the second value, then a common method of determining the initial value of the quantity parameter according to the height parameter and the width parameter, may still be used. For example, based on the above Table 1, set remBinsPass1= ((1<<(log 2TbWidth+log 2TbHeight))×7)>>2.

That is to say, in the present disclosure, based on the above Table 1, for RRC, if the context mode flag is used to determine whether the syntax elements of the coefficient of the context mode are reduced, i.e., flag context_coded_level_bins_reduced_flag is used to represent the context mode flag, then when determining the initial value remBinsPass1 of the quantity parameter according to the context mode flag, the statement remBinsPass1=((1<<(log 2TbWidth+log 2TbHeight))×7)>>2 in the above Table 1 may be replaced with a conditional statement illustrated in the following Table 5.

TABLE 5

```
if(context_coded_level_bins_reduced_flag){
  remBinsPass1=((1<<(log2TbWidth+log2TbHeight))×7)>>4
}else{
  emBinsPass1=((1<<(log2TbWidth+log2TbHeight))×7)>>2
}
```

It can be seen that after the context mode flag context_coded_level_bins_reduced_flag of the current block is determined by parsing the bitstream, if context_coded_level_bins_reduced_flag is not 0, then set remBinsPass1=((1<<(log 2TbWidth+log 2TbHeight))×7)>>4, so that the number of syntax elements decoded in the context mode during subsequent processing is reduced. If context_coded_level_bins_reduced_flag is 0, the method for setting the initial value of remBinsPass1 may be the same as that in the above Table 1, that is, set remBinsPass1=((1<<(log 2TbWidth+log 2TbHeight))×7)>>2.

Optionally, in the present disclosure, if the value of the context mode flag is the first value, then remBinsPass1 may be set in another method. For example, a parameter is set, and then the initial value of remBinsPass1 may be set as remBinsPass1=((1<<(log 2TbWidth+log 2TbHeight))×7)>>(2+parameter).

The parameter may be determined by a flag of a sequence level, a slice level, or other levels. Specifically, if the flag is absent, the value of the parameter is 0. The value of the parameter may be 0, 1, 2, 3, etc. Then the syntax may be modified without the if-else statement, enabling more flexible adjustment.

Exemplarily, in the present disclosure, ccb_right_shift_level_flag may be set and the value of ccb_right_shift_level_flag may be 0, 1, 2, 3, 4, 5, or 6. The value of the parameter is equal to the value of ccb_right_shift_level_flag. If ccb_right_shift_level_flag is absent, the value of the parameter is 0.

It may be noted that, in the present disclosure, based on the above Table 2, the TSRC method sets the syntax elements decoded in the context mode in two rounds. For any one coefficient, a maximum of 4 syntax elements decoded in the context mode may be processed in each of the first and second rounds. Therefore, only when RemCcbs>=4 is true can the syntax elements decoded in the context mode be processed in the first or second round. That is, the syntax element decoded in the context mode will not be processed when RemCcbs<4.

Accordingly, in the present disclosure, if the value of context mode flag is the first value, then the initial value of the quantity parameter may be directly determined as a fixed value. For example, remBinsPass1 is set to the second quantity value, or the initial value of the quantity parameter is determined as remBinsPass1=((1<<(log 2TbWidth+log 2TbHeight))×7)>>4 (i.e. the first shift parameter is 4), thereby reducing the number of syntax elements decoded in the context mode. If the value of the context mode flag is the second value, then a common method of determining the initial value of the quantity parameter according to the height parameter and the width parameter, may still be used.

For example, based on the above Table 1, set remBinsPass1=((1<<(log 2TbWidth+log 2TbHeight))×7)>>2.

That is to say, in the present disclosure, based on the above Table 2, for TSRC, if the context mode flag is used to determine whether the syntax elements of the coefficient of the context mode are reduced, i.e., flag context_coded_level_bins_reduced_flag is used to represent the context mode flag, then when determining the initial value RemCcbs of the quantity parameter according to the context mode flag, the statement remBinsPass1=((1<<(log 2TbWidth+log 2TbHeight))×7)>>2 in the above Table 2 may be replaced with a conditional statement illustrated in the following Table 6.

TABLE 6

```
if(context_coded_level_bins_reduced_flag){
  RemCcbs=((1<<(log2TbWidth+log2TbHeight))×7)>>4
}else{
  RemCcbs=((1<<(log2TbWidth+log2TbHeight))×7)>>2
}
```

It can be seen that after the bitstream is parsed and the context mode flag context_coded_level_bins_reduced_flag of the current block is determined, if context_coded_level_bins_reduced_flag is not 0, then RemCcbs=((1<<(log 2TbWidth+log 2TbHeight))×7)>>4 is set, so that the number of syntax elements decoded in the context mode and processed later is reduced. If context_coded_level_bins_reduced_flag is 0, the method for setting the initial value of RemCcbs may be the same as the above Table 2, that is, RemCcbs=((1<<(log 2TbWidth+log 2TbHeight))×7)>>2 is set.

Optionally, in the present disclosure, if the value of the context mode flag is the first value, then RemCcbs may be set in another method. For example, when setting a parameter, the initial value of RemCcbs may be set as RemCcbs=((1<<(log 2TbWidth+log 2TbHeight))×7)>>(2+parameter).

The parameter may be determined by a flag of a sequence level, a slice level, or other levels. Specifically, if the flag is absent, the value of parameter is 0. The value of the parameter may be 0, 1, 2, 3, or etc. Then the syntax may be modified without the if-else statement. The adjustment may also be more flexible.

Exemplarily, in the present disclosure, ccb_right_shift_level_flag may be set and the value of ccb_right_shift_level_flag may be 0, 1, 2, 3, 4, 5, or 6. The value of the parameter is equal to the value of ccb_right_shift_level_flag. If ccb_right_shift_level_flag is absent, then the value of the parameter is 0.

Further, in the present disclosure, the parameter value of the quantity parameter set before entering the decoding stage for syntax elements may be considered as the initial value of the quantity parameter. Therefore, even if RemCcbs=((1<< (log 2TbWidth+log 2TbHeight))×7)>>2 is set in the manner of the above Table 1 or Table 2, the initial value of the quantity parameter may be re-set according to the method proposed in the present disclosure and the re-set parameter value may be determined as the initial value of the quantity parameter as long as the value of the context mode flag (context_coded_level_bins_disabled_flag or context_coded_level_bins_reduced_flag) is the first value before entering the decoding stage for syntax elements (that is, before performing remBinsPass1- or RemCcbs-).

Exemplarily, based on the Table 3 above, the conditional statements in the following Table 7 may be used instead.

TABLE 7

| remBinsPass1=((1<<(log2TbWidth+log2TbHeight))×7)>>2 if(context_coded_level_bins_disabled_flag){ remBinsPass1=0 } ...... |
| --- |

Exemplarily, based on the Table 4 above, the conditional statements in the following Table 8 may be used instead.

TABLE 8

| RemCcbs=((1<<(log2TbWidth+log2TbHeight))×7)>>2 if(context_coded_level_bins_disabled_flag){ RemCcbs=0 } ...... |
| --- |

Exemplarily, based on the Table 5 above, the conditional statements in the following Table 9 may be used instead.

TABLE 9

| remBinsPass1=((1<<(log2TbWidth+log2TbHeight))×7)>>2 if(context_coded_level_bins_reduced_flag){ remBinsPass1=((1<<(log2TbWidth+log2TbHeight))×7)>>4 } ...... |
| --- |

Exemplarily, based on the Table 6 above, the conditional statements in the following Table 10 may be used instead.

TABLE 10

| RemCcbs =((1<<(log2TbWidth+log2TbHeight))×7)>>2 if(context_coded_level_bins_reduced_flag){ RemCcbs =((1<<(log2TbWidth+log2TbHeight))×7)>>4 } ...... |
| --- |

At operation 1103, coefficients of the current block are determined using at least one of the context mode or the bypass mode according to the initial value of the quantity parameter.

In the embodiments of the present disclosure, after the initial value of the quantity parameter is determined according to the context mode flag, the decoder may use at least one of the context mode or the bypass mode to determine the coefficients of the current block according to the initial value of the quantity parameter.

Further, in the embodiments of the present disclosure, when determining the coefficient of the current block using at least one of the context mode or the bypass mode according to the initial value of the quantity parameter, if the initial value of the quantity parameter is greater than or equal to a quantity threshold, then the coefficients of the current block may be determined using the context mode. If the initial value of the quantity parameter is less than the quantity threshold, the coefficients of the current block may be determined using the bypass mode.

It may be noted that, in the embodiments of the present disclosure, if the initial value of the quantity parameter is greater than or equal to the quantity threshold, then the coefficients of the current block may be determined using both the context mode and the bypass mode, that is, the coefficients of the current block are determined using at least the context mode.

It may be noted that, in the embodiments of the present disclosure, if the initial value of the quantity parameter is less than the quantity threshold, then only the bypass mode may be used to determine the coefficients of the current block, and the context mode may no longer be used to determine the coefficients of the current block.

It can be understood that, in the present disclosure, whether for RRC or TSRC, the syntax elements decoded in the context mode are processed only when remBinsPass1>=4 is true or RemCcbs>=4 is true. Therefore, the quantity threshold may be set as 4.

It can be understood that, in embodiments of the present disclosure, the initial value of the quantity parameter is reduced or set to 0 (or 1 or 2 or 3) based on the context mode flag, and according to the initial value of the quantity parameter, it is determined whether to further reconstruct the coefficients of the current block without the context mode.

Further, in the present disclosure, all coefficients before the position of the last significant coefficient may be sequentially decoded based on the context mode or the bypass mode, and finally the reconstructed coefficients of the current block may be determined, that is, the coefficients of the current block may be reconstructed.

It can be understood that, in the present disclosure, all coefficients before the position of the last significant coefficient may be sequentially decoded according to a preset scanning order, and the preset scanning order may be a diagonal order, a zigzag order, a horizontal order, a vertical order, a 4×4 sub-block scanning order, or any other scanning order, which is not limited in the embodiments of the present disclosure.

It may be noted that, in the present disclosure, for RRC, after entering the function residual_coding (x0, y0, log 2TbWidth, log 2TbHeight, cIdx), it is necessary to determine some information about the block size, such as determining the logarithms log 2ZoTbWidth and log 2ZoTbHeight of the block size after zero-out, where coefficients with a horizontal coordinate in a range [0, (1<<log 2ZoTbWidth)−1] and a vertical coordinate in a range [0, (1<<log 2ZoTbHeight)−1] may be significant coefficients. Here, (1<<log 2ZoTbWidth) represents the width of the transform block after zero-out, and (1<<log 2ZoTbHeight) represents the height of the transform block after zero-out. Then the position of the last significant coefficient is determined based on last_sig_coeff_x_prefix, last_sig_coeff_y_prefix, last_sig_coeff_x_suffix, last_sig_coeff_y_suffix, and so on. The coefficients before (preceding) the last significant coefficient in scanning order may be significant coefficients. Then the value of remBinsPass1 is further determined using a context mode flag (context_coded_level_bins_disabled_flag or context_coded_level_bins_reduced_flag). If the value of the context mode flag context_coded_level_bins_disabled_flag is the first value, then the value of remBinsPass1 may be directly determined as 0. If the value of the context mode flag context_coded_level_bins_reduced_flag is the first value, then the value of remBinsPass1 may be directly determined as a value less than ((1<<(log 2TbWidth+log 2TbHeight))×7)>>2. Then, the number of syntax element decoded using the context mode in the current block is determined via remBinsPass1. The coefficients before the last significant coefficient in scanning order need to be decoded. For the sub-blocks containing these coefficients, it is determined whether each current sub-block needs to be decoded, and if so, the method sets the syntax elements decoded in context mode in a sub-block in the first round. In the first round, for each coefficient, it may need to process at most 4 context-mode decoded syntax elements, i.e., one sig_coeff_flag, two abs_level_gtx_flag, and one par_level_flag, and remBinsPass1 is decremented by 1 each time a context-mode decoded syntax element is processed. If a coefficient is large enough, the remaining value, i.e., abs_remainder, needs to be processed after the syntax elements decoded in context mode in the first round are processed. If remBinsPass1 is already small enough (does not satisfy remBinsPass1>=4), the first round ends, and the remaining coefficients are processed directly in bypass mode, i.e., dec_abs_level.

Accordingly, in the present disclosure, for TSRC, after entering the function residual_ts_coding (x0, y0, log 2TbWidth, log 2TbHeight, cIdx), some information about the block size needs to be determined. The value of RemCcbs is further determined using the context mode flag (context_coded_level_bins_disabled_flag or context_coded_level_bins_reduced_flag). If the value of the context mode flag context_coded_level_bins_disabled_flag is the first value, then the value of RemCcbs may be directly determined as 0. If the value of the context mode flag context_coded_level_bins_reduced_flag is the first value, then the value of RemCcbs may be directly determined as a value less than $((1<<(\log 2TbWidth+\log 2TbHeight))\times 7)>>2$. Then, the number of syntax element decoded using the context mode in the current block is determined via RemCcbs. The coefficients before the last significant coefficient in scanning order need to be decoded. For the sub-blocks containing these coefficients, it is determined whether the current sub-block requires to be decoded, and if so, different from the RRC described above, the TSRC method sets the syntax elements decoded in the context mode in a sub-block in two rounds, with up to four context-mode decoded syntax elements are processed for each coefficient in the first and second rounds, respectively. In the first and second rounds, RemCcbs is decremented by 1 each time a context-mode decoded syntax element is processed. If a coefficient is large enough, the remaining value, i.e., abs_remainder, needs to be processed after the context-mode decoded syntax elements have been processed in the first and second rounds. If RemCcbs is small enough (does not satisfy remBinsPass1>=4), the first two rounds will be ended and the remaining coefficients will be processed directly in bypass mode, in this case still abs_remainder.

Further, in the present disclosure, for a coefficient sign flag coeff_sign_flag, if transform_skip_flag[x0][y0][cIdx]==0||n>lastScanPosPass1||sh_ts_residual_coding_disabled_flag is true, coeff_sign_flag is decoded using the bypass mode. Otherwise, coeff_sign_flag is decoded using the context mode.

It can be understood that in the present disclosure, if remBinsPass1 or RemCcbs is reduced, lastScanPosPass1 is reduced, then the number of coeff_sign_flag decoded in the context mode is also reduced. If remBinsPass1 or RemCcbs is set to 0 when context_coded_level_bins_disabled_flag is true, in the corresponding RRC or TSRC, the context mode will not be used to decode coeff_sign_flag. If the value of remBinsPass1 or RemCcbs is set as a smaller value than that configured in the existing method when context_coded_level_bins_reduced_flag is true, in the corresponding RRC or TSRC, the number of times the context mode is used during decoding coeff_sign_flag will be reduced. In this way, the number of syntax elements decoded in the context mode can be further reduced.

It may be noted that, in the embodiments of the present disclosure, a sub-block coded flag may be represented by sb_coded_flag. Exemplarily, if the value of the sb_coded_flag is 1, it may be determined that all coefficients in a sub-block to-be-decoded need to be decoded in sequence.

If the value of the sb_coded_flag is 0, it may be determined that all coefficients in the sub-block to-be-decoded do not need to be decoded in sequence, and in this case all the coefficients in the sub-block to-be-decoded are zero.

Optionally, in the present disclosure, for certain cases, during coefficient coding, all scanned sub-blocks default to requiring coding, or all scanned sub-blocks contain significant coefficients by default. That is to say, in usual cases, the coefficient coding method is still the same as the method available in the related art. For example, the certain cases may refer to high bit depth, high quality, or high bitrate video, or lossless compression in video coding. In this case, there are many significant coefficients and almost all of the scanned sub-blocks require to be coded, or in other words, almost all of the scanned sub-blocks contain significant coefficients. As such, there is no need to transmit the sb_coded_flag in the bitstream, and the encoder/decoder does not need to process this flag, thus enabling faster coding speed. There is also a small compression performance gain in this case due to the removal of an almost non-existent flag.

Further, in the present disclosure, if the value of the context mode flag obtained by decoding is the first value, then the sub-block coded flag sb_coded_flag of the current block may be determined using the bypass mode, and the context mode is no longer used to determine the sub-block coded flag sb_coded_flag of the current block.

It may be noted that, in the present disclosure, for TSRC, sb_coded_flag is decoded in the context mode. If sb_coded_flag is removed or sb_coded_flag is changed to be decoded in the bypass mode, then all the coefficients of the entire block are decoded in the bypass mode, which can further improve the coding speed or throughput.

Exemplarily, in the present disclosure, if the value of context_coded_level_bins_disabled_flag is the first value, then sb_coded_flag is decoded in the bypass mode. If the value of context_coded_level_bins_disabled_flag is the second value, then sb_coded_flag is decoded in the context mode.

Further, in the present disclosure, if the value of the context mode flag obtained by decoding is the first value, then prefix information last_sig_coeff_x_prefix of a horizontal coordinate of the last significant coefficient, prefix information last_sig_coeff_y_prefix of a vertical coordinate of the last significant coefficient, suffix information last_sig_coeff_x_suffix of the horizontal coordinate of the last significant coefficient, and suffix information last_sig_coeff_y_suffix of the vertical coordinate of the last significant coefficient in the current block are determined using the bypass mode.

It may be noted that, in the present disclosure, for RRC, last_sig_coeff_x_prefix, last_sig_coeff_y_prefix, last_sig_coeff_x_suffix, and last_sig_coeff_y_suffix are decoded in the context mode. If the last_sig_coeff_x_prefix, last_sig_coeff_y_prefix, last_sig_coeff_x_suffix, and last_sig_coeff_y_suffix are removed or changed to be decoded in the bypass mode, coding speed or throughput can be further improved.

Exemplarily, in the present disclosure, if the value of context_coded_level_bins_disabled_flag is the first value, then last_sig_coeff_x_prefix, last_sig_coeff_y_prefix, last_sig_coeff_x_suffix, and last_sig_coeff_y_suffix are decoded in the bypass mode. If the value of context_coded_level_bins_disabled_flag is the second value, then last_sig_coeff_x_prefix, last_sig_coeff_y_prefix, last_sig_coeff_x_suffix, and last_sig_coeff_y_suffix are decoded in the context mode.

It may be understood that, in the embodiments of the present disclosure, the coefficient decoding methods of the embodiments of the present disclosure are described based on an example that the technical solution is used for all components in the video, where all components refer to, e.g., R, G, and B in the RGB format video, or Y, U, and V (Y, Cb, and Cr) in the YUV format video, and the like. Optionally, the coefficient decoding method of the embodiments of the present disclosure may be used only for a certain component, such as only for the Y component of the YUV format. Optionally, the coefficient decoding method of the embodiments of the present disclosure may be used for each component separately, i.e., whether to use for each component may be controlled separately, which is not limited in the present disclosure.

In summary, in the embodiments of the present disclosure, with the decoding method proposed in operation 1101 to operation 1103 above, during video coding with high bit depth, high bitrate, or high quality, because of a different distribution pattern of coefficients from a common video scenario, throughput of coefficient decoding can be improved by reducing the number of syntax elements or even eliminating the syntax elements coded in the context mode. In addition, because the design of syntax elements decoded in the context mode takes advantage of the distribution pattern of coefficients in common videos, the compression efficiency for common videos is significantly improved. However, the design of syntax elements decoded in the context mode does not conform to the distribution pattern of coefficients in videos with high bit depth, high bitrate, and high quality. Reducing or even eliminating the use of syntax elements decoded in context mode for videos with high bit depth, high bitrate, and high quality will not reduce the compression efficiency and can improve the compression efficiency to a certain extent instead.

It can be understood that, in the present disclosure, for a certain scenario, during coefficient decoding, the number of syntax elements coded in the context mode may be reduced. That is to say, in general, the method for coefficient coding is the same as the common method. However, during coefficient coding for videos with high bit depth, high quality, high bitrate, or high frame rate, during coefficient decoding, the number of syntax elements decoded in the context mode is reduced.

Specifically, in the present disclosure, it is optional to reduce the number of syntax elements decoded in the context mode to 0. Further, it is optional to code all coefficients in the bypass mode while reducing the number of syntax elements coded in the context mode to 0. The method proposed in the present disclosure may be applied to RRC and/or TSRC.

Embodiments of the disclosure provide a decoding method. The decoder decodes a bitstream to determine a context mode flag of a current block, determines an initial value of a quantity parameter according to the context mode flag, and determines coefficients of the current block using at least one of a context mode or a bypass mode according to the initial value of the quantity parameter. That is to say, in the embodiments of the disclosure, when coding the coefficients, based on the context mode flag, the coder may choose whether to code the coefficients of the current block using the context mode or may perform adjustment of the initial value of the quantity parameter, thereby improving the throughput of coefficient coding and the speed of coding, reducing complexity, and implementing the simple and efficient coding method by reducing the number of syntax elements and even eliminating syntax elements for context mode coding in the process of coding the coefficients, thus improving compression performance.

Figure 11:
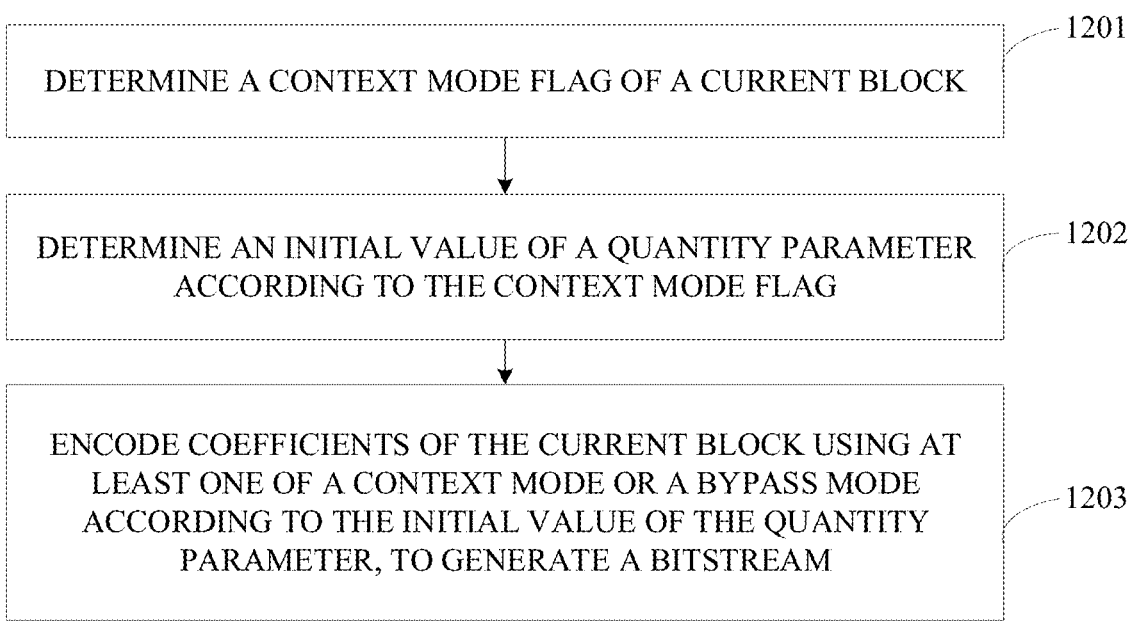
FIG. 11 is a schematic implementation flowchart of an encoding method.

Based on the foregoing embodiments, another embodiment of the present disclosure provides an encoding method that is applied to an encoder. FIG. 11 is a schematic implementation diagram of an encoding method. As illustrated in FIG. 11, the encoding method performed by the encoder may include the following operations.

At operation 1201, a context mode flag of a current block is determined.

In the embodiments of the present disclosure, the encoder may first determine the context mode flag of the current block.

It may be noted that, in embodiments of the present disclosure, the context mode flag may be used to determine an initial value of a quantity parameter.

The initial value of the quantity parameter indicates a maximum number of syntax elements which can be coded in the context mode. Specifically, the quantity parameter may be a parameter indicating the number of remaining syntax elements coded in the context mode available for the current block. The initial value of the quantity parameter is an initially configured value of the quantity parameter.

Further, in embodiments of the present disclosure, the context mode flag may be considered as a flag indicating that coefficients of the current block are determined in the context mode, or the context mode flag may be considered as a flag indicating that values of the coefficients of the current block are determined in the context mode. Specifically, the encoder may determine a variable as the context mode flag and then determine the context mode flag according to a value of the variable.

It may be noted that, in the present disclosure, the value of the context mode flag may be a first value or a second value. Specifically, the initial value of the quantity parameter is determined differently depending on the value of the context mode flag.

Exemplarily, in the present disclosure, the first value may be set as 1 and the second value may be set as 0, or the first value may be set as true and the second value may be set as false. The present disclosure is not limited hereto.

Exemplarily, in the present disclosure, if the context mode flag is used to determine whether the context mode is used to determine coefficients of the current block (or values of the coefficients of the current block) or not, then the context mode flag may be represented by a flag context_coded_level_bins_disabled_flag.

Specifically, in the present disclosure, if the value of context_coded_level_bins_disabled_flag is 1, then it may indicate that the context mode is not used to determine coefficients of the current block (or the values of the coefficients of the current block). If the value of context_coded_level_bins_disabled_flag is 0, then it may indicate that the context mode is used to determine coefficients of the current block (or the values of coefficients of the current block).

Further, in embodiments of the present disclosure, the context mode flag may be considered as a flag indicating whether the initial value of the quantity parameter is reduced. Specifically, the encoder may determine a variable as the context mode flag and then determine the context mode flag according to a value of the variable.

Exemplarily, in the present disclosure, if the context mode flag is used to determine whether the initial value of the quantity parameter is reduced for the current block, the context mode flag may be represented by a flag context_coded_level_bins_reduced_flag.

Specifically, in the present disclosure, if the value of context_coded_level_bins_reduced_flag is 1, then it may indicate that the initial value of the quantity parameter is reduced. If the value of context_coded_level_bins_reduced_flag is 0, then it may indicate that the initial value of the quantity parameter is not reduced.

It may be noted that, in the embodiments of the present disclosure, a video picture may be partitioned into multiple picture blocks. The current block is each current picture block to-be-coded, which can be referred to as a coding block (CB). Here, each coding block may include a first colour component, a second colour component, and a third colour component. Specifically, in the present disclosure, assume that a first intra prediction is performed and the first colour component is a luma component, i.e., a colour component to-be-predicted is the luma component, then the coding block to-be-predicted may be referred to as a luma block. In another example, assume that a second intra prediction is performed and the second colour component is a chroma component, i.e., the colour component to-be-predicted is the chroma component, then the coding block to-be-predicted may be referred to as a chroma block.

Further, in the present disclosure, the current block may be a picture block that is not transformed or a transform block that has been transformed. For example, the current block may be a zero-out transform block.

It may be noted that, in the present disclosure, the encoder may further determine a height parameter and a width parameter of the current block. Specifically, the height parameter and the width parameter of the current block may be used to determine a size of the current block.

Exemplarily, in the present disclosure, for the zero-out current block, after the logarithms log 2ZoTbWidth and log 2ZoTbHeight of the size of the current block are determined, (1<<log 2ZoTbHeight) may be used to represent the corresponding height parameter, and (1<<log 2ZoTbWidth) may be used to represent the corresponding width parameter.

Further, in embodiments of the present disclosure, the encoder may further determine a video flag. If the video flag indicates that the video satisfies a preset condition, then a process for determining the context mode flag may be performed.

It may be noted that, in embodiments of the present disclosure, the preset condition includes at least one of the following conditions: high bit depth, high quality, high bitrate, high frame rate, or lossless compression.

It may be understood that, in the present disclosure, for the conventional video, the method for decoding coefficients is the same as the existing method in the related art. However, for a certain case, such as unconventional videos with high bit depth, high quality, high bitrate, high frame rate, or lossless compression, the embodiments of the present disclosure may introduce a process for determining the context mode flag during coefficients coding.

That is to say, compared with the conventional video, the unconventional video has higher bit depth, higher quality, higher bitrate, and higher frame rate, and the unconventional video is lossless compressed.

Further, in the embodiments of the present disclosure, it may be first determined whether the current video is a conventional video, which may be represented by the video flag. Specifically, if the value of the video flag is the first value, then the video flag indicates that the video satisfies the preset condition, which means that the video is an unconventional video. If the value of the video flag is the second value, then the video flag indicates that the video does not satisfy the preset condition, which means that the video is a conventional video.

Exemplarily, in the present disclosure, the first value may be set as 1 and the second value may be set as 2, or the first value may be set as true and the second value may be set as false. The present disclosure is not limited hereto.

Further, in the present disclosure, the video flag may be a sequence-level flag or even a higher level flag, such as video usability information (VUI), supplemental enhancement information (SEI), etc. Whether the video satisfies the preset condition may be determined by determining whether the video satisfies high bit depth, or whether the video satisfies high bitrate, or whether the video satisfies high quality, or whether the video satisfies lossless compression, etc. The following describes each of these four cases as examples.

Optionally, in the present disclosure, when the video flag is a high-bit-depth sequence flag, if the video satisfies high bit depth, it is determined that the high-bit-depth sequence flag indicates that the video satisfies the preset condition.

Optionally, in the present disclosure, when the video flag is a high-bitrate sequence flag, if the video satisfies high bitrate, it is determined that the high-bitrate sequence flag indicates that the video satisfies the preset condition.

Optionally, in the present disclosure, when the video flag is a high-quality sequence flag, if the video satisfies high quality, it is determined that the high-quality sequence flag indicates that the video satisfies the preset condition.

Optionally, in the present disclosure, when the video flag is a high-frame-rate sequence flag, if the video satisfies high frame rate, it is determined that the high-frame-rate sequence flag indicates that the video satisfies the preset condition.

Optionally, in the present disclosure, when the video flag is a lossless-compression sequence flag, if the video satisfies lossless compression, it is determined that the lossless-compression sequence flag indicates that the video satisfies the preset condition.

That is to say, in the present disclosure, the video flag may be the high-bit-depth sequence flag (represented by sps_high_bit_depth_flag) for indicating whether a current video is a high-bit-depth sequence. The video flag may also be the high-bitrate sequence flag (represented by sps_high_bit_rate_flag) for indicating whether a current video is a high-bitrate sequence. The video flag may also be another flag indicating high bit depth, high bitrate, high quality, high frame rate, or lossless compression, which is not specifically limited in the embodiments of the present disclosure.

It can be seen that, in the present disclosure, the determination of the context mode flag may depend on the determination of the video flag. That is to say, context_coded_level_bins_disabled_flag or context_coded_level_bins_reduced_flag may depend on some other flags such as the high-bit-depth flag or the high-bitrate flag.

Exemplarily, in the present disclosure, when the value of the high-bit-depth flag or the high-bitrate flag is 1, the flag context_coded_level_bins_disabled_flag or context_coded_level_bins_reduced_flag needs to be encoded. When the value of the high-bit-depth flag or the high-bitrate flag is not 1, the flag context_coded_level_bins_disabled_flag or context_coded_level_bins_reduced_flag does not need to be encoded.

It may be noted that, coefficient coding commonly referred to in video standards may include two parts: encoding and decoding. Therefore, the coefficient coding includes a coefficient encoding method at an encoder side and a coefficient decoding method at a decoder side. The embodiments of the present disclosure describe the coefficient encoding method at the encoder side.

At operation 1202, an initial value of a quantity parameter is determined according to the context mode flag.

In the embodiments of the disclosure, after determining the context mode flag of the current block, the encoder may further determine the initial value of the quantity parameter according to the context mode flag.

It may be understood that, in embodiments of the present disclosure, the initial value of the quantity parameter may be used to determine the number of syntax elements encoded using the context mode in the current block.

That is to say, in the present disclosure, the initial value of the quantity parameter may be considered as a parameter indicating the number of syntax elements encoded in the context mode in the current block.

It can be understood that, in embodiments of the present disclosure, the initial value of the quantity parameter indicates a maximum number of syntax elements which can be coded in the context mode. Specifically, the quantity parameter may indicate the number of remaining syntax elements coded in the context mode available for the current block. The initial value of the quantity parameter is an initially configured value of the quantity parameter.

That is to say, in the present disclosure, the quantity parameter may be considered as a parameter indicating the number of syntax elements decoded in the context mode in the current block.

Further, in the present disclosure, the parameter value of the quantity parameter set before entering the decoding stage for syntax elements is the initial value of the quantity parameter.

Exemplarily, based on the above Table 1, for RRC, flag remBinsPass1 may be used to represent the quantity parameter, and then the initial value of remBinsPass1 set before coding the syntax elements is the initial value of the quantity parameter.

Exemplarily, based on the above Table 2, for TSRC, flag RemCcbs may be used to represent the quantity parameter, and then the initial value of RemCcbs set before coding the syntax elements is the initial value of the quantity parameter.

Further, in embodiments of the present disclosure, when the initial value of the quantity parameter is determined according to the context mode flag, if the value of the context mode flag is the first value, then the initial value of the quantity parameter may be determined as a first quantity value. If the value of the context mode flag is the second value, then the initial value of the quantity parameter may be determined according to the height parameter and the width parameter of the current block.

The first quantity value is an integer greater than or equal to 0 and less than a quantity threshold. For example, if the quantity threshold is 4, then the first quantity value may be set as 0, 1, 2 or 3.

It may be noted that, in the present disclosure, based on the above Table 1, for any one coefficient, a maximum of 4 syntax elements encoded in the context mode may need to be processed. Therefore, the syntax elements encoded in the context mode can be processed only when remBinsPass1>=4 is true. That is to say, the syntax element(s) encoded in the context mode is not processed when remBinsPass1<4.

Accordingly, in the present disclosure, if the value of the context mode flag is the first value, then the initial value of the quantity parameter may be determined as the first quantity value, such that remBinsPass1>=4 is not true, and then the syntax element coded in the context mode is not processed. If the value of the context mode flag is the second value, then a common method in which the initial value of the quantity parameter is determined according to the height parameter and the width parameter, may still be used. For example, based on the above Table 1, set remBinsPass1= ((1<<(log 2TbWidth+log 2TbHeight))×7)>>2.

That is to say, in the present disclosure, based on the above Table 1, for RRC, if the context mode flag is used to determine whether the context mode is used to determine coefficients of the current block (or the values of coefficients of the current block), and context_coded_level_bins_disabled_flag is used to represent the context mode flag, then for determining the initial value remBinsPass1 of the quantity parameter according to the context mode flag, statement remBinsPass1=((1<<(log 2TbWidth+log 2TbHeight))× 7)>>2 in the above Table 1 may be replaced with the conditional statement illustrated in the above Table 3.

It can be seen that after the context mode flag context_coded_level_bins_disabled_flag of the current block is determined, if context_coded_level_bins_disabled_flag is not 0, then set remBinsPass1=0, such that remBinsPass1>=4 is not true and thus the syntax element encoded in the context mode is not processed. If context_coded_level_bins_disabled_flag is 0 (or 1, or 2, or 3), the method for setting the initial value of remBinsPass1 may be the same as that in the above Table 1, namely set remBinsPass1=((1<<(log 2TbWidth+log 2TbHeight))× 7)>>2.

It may be noted that, in the present disclosure, based on the above Table 2, the TSRC method sets the syntax elements encoded in the context mode in two rounds. For any one coefficient, a maximum of 4 syntax elements encoded in the context mode may be processed in each of the first and second rounds. Therefore, only when RemCcbs>=4 is true can the syntax elements encoded in the context mode be processed in the first or second round. That is, the syntax element encoded in the context mode will not be processed when RemCcbs<4.

Accordingly, in the present disclosure, if the value of the context mode flag is the first value, then the initial value of the quantity parameter may be determined directly as the first quantity value, such that RemCcbs>=4 is not true and thus the syntax element decoded in the context mode is not processed. If the value of the context mode flag is the second value, then a common method in which the initial value of the quantity parameter is determined according to the height parameter and the width parameter, may still be used. For example, based on the above Table 2, set RemCcbs=((1<< (log 2TbWidth+log 2TbHeight))×7)>>2.

That is to say, in the present disclosure, based on the above Table 2, for TSRC, if the context mode flag is used to determine whether the context mode is used to determine the coefficients of the current block (or the values of coefficients of the current block), and the flag context_coded_level_bins_disabled_flag is used to represent the context mode flag, then when determining the initial value RemCcbs of the quantity parameter according to the context mode flag, statement RemCcbs=((1<<(log 2TbWidth+log 2TbHeight))×7)>>2 in the above Table 2 may be replaced with a conditional statement illustrated in the above Table 4.

It can be seen that after the context mode flag context_coded_level_bins_disabled_flag of the current block is determined, if context_coded_level_bins_disabled_flag is not 0, then set RemCcbs=0 (or 1, or 2, or 3), such that RemCcbs>=4 is not true and thus the syntax element encoded in the context mode is not processed. If context_coded_level_bins_disabled_flag is 0, the method for setting the initial value of RemCcbs may be the same as that in the above Table 2, namely set RemCcbs=$((1<<(\log 2\text{TbWidth}+\log 2\text{TbHeight}))\times7)>>2$.

Further, in embodiments of the present disclosure, if the context mode flag is used to determine whether the initial value of the quantity parameter is reduced, then when determining the initial value of the quantity parameter according to the context mode flag, if the value of the context mode flag is the first value, the initial value of the quantity parameter may be determined as the second quantity value. If the value of the context mode flag is the second value, the initial value of the quantity parameter may be determined according to the height parameter and the width parameter.

It may be noted that, in the embodiments of the present disclosure, the second quantity value may be used to reduce the initial value of the quantity parameter. Specifically, the second quantity value may be smaller than the initial value of the quantity parameter which is determined according to the height parameter and the width parameter.

Optionally, in the present disclosure, if the context mode flag is used to determine whether the initial value of the quantity parameter is reduced, then when determining the initial value of the quantity parameter according to the context mode flag, if the value of the context mode flag is the first value, the initial value of the quantity parameter may be determined according to the height parameter, the width parameter, and a first shift parameter. If the value of the context mode flag is the second value, the initial value of the quantity parameter may then be determined according to the height parameter, the width parameter, and a second shift parameter.

It may be noted that, in the embodiments of the present disclosure, the first shift parameter and the second shift parameter each may be used for right shifting. The first shift parameter is greater than the second shift parameter. That is to say, when other conditions are the same, after being right-shifted according to the first shift parameter and the second shift parameter respectively, the initial value of the quantity parameter corresponding to the first shift parameter is less than the initial value of the quantity parameter corresponding to the second shift parameter.

As can be seen, in the present disclosure, if the value of the context mode flag is the first value, then whether to determine the value of the initial value of the quantity parameter as a fixed value (the second quantity value), or to increase the number of right-shifting bits for calculating the initial value of the quantity parameter (the original first shift parameter is adjusted to be the second shift parameter), the ultimate purpose is to reduce the initial value of the quantity parameter, that is, to adjust the initial value of the quantity parameter is to reduce the number of syntax elements encoded in the context mode.

It may be noted that, in the present disclosure, based on the above Table 1, for any one coefficient, a maximum of 4 syntax elements encoded in the context mode may need to be processed. Therefore, the syntax elements encoded in the context mode may be processed only when remBinsPass1>=4 is true. That is, when remBinsPass1<4, the syntax element encoded in the context mode is not processed.

Accordingly, in the present disclosure, if the value of the context mode flag is the first value, then the initial value of the quantity parameter may be directly determined as a fixed value. For example, remBinsPass1 is set to the second quantity value, or the initial value of the quantity parameter is determined as remBinsPass1=$((1<<(\log 2\text{TbWidth}+\log 2\text{TbHeight}))\times7)>>4$ (i.e. the first shift parameter is 4), thereby reducing the number of syntax elements decoded in the context mode. If the value of the context mode flag is the second value, then a common method of determining the initial value of the quantity parameter according to the height parameter and the width parameter, may still be used. For example, based on the above Table 1, set remBinsPass1=$((1<<(\log 2\text{TbWidth}+\log 2\text{TbHeight}))\times7)>>2$.

That is to say, in the present disclosure, based on the above Table 1, for RRC, if the context mode flag is used to determine whether the syntax elements of the coefficient of the context mode are reduced, i.e., flag context_coded_level_bins_reduced_flag is used to represent the context mode flag, then when determining the initial value remBinsPass1 of the quantity parameter according to the context mode flag, the statement remBinsPass1=$((1<<(\log 2\text{TbWidth}+\log 2\text{TbHeight}))\times7)>>2$ in the above Table 1 may be replaced with a conditional statement illustrated in the above Table 5.

It can be seen that after the context mode flag context_coded_level_bins_reduced_flag of the current block is determined, if context_coded_level_bins_reduced_flag is not 0, then set remBinsPass1=$((1<<(\log 2\text{TbWidth}+\log 2\text{TbHeight}))\times7)>>4$, so that the number of syntax elements encoded in the context mode during subsequent processing is reduced. If context_coded_level_bins_reduced_flag is 0, the method for setting the initial value of remBinsPass1 may be the same as that in the above Table 1, that is, set remBinsPass1=$((1<<(\log 2\text{TbWidth}+\log 2\text{TbHeight}))\times7)>>2$.

Optionally, in the present disclosure, if the value of the context mode flag is the first value, then remBinsPass1 may be set in another method. For example, a parameter is set, and then the initial value of remBinsPass1 may be set as remBinsPass1=$((1<<(\log 2\text{TbWidth}+\log 2\text{TbHeight}))\times7)>>(2+\text{parameter})$.

The parameter may be determined by a flag of a sequence level, a slice level, or other levels. Specifically, if the flag is absent, the value of the parameter is 0. The value of the parameter may be 0, 1, 2, 3, etc. Then the syntax may be modified without the if-else statement, enabling more flexible adjustment.

Exemplarily, in the present disclosure, ccb_right_shift_level_flag may be set and the value of ccb_right_shift_level_flag may be 0, 1, 2, 3, 4, 5, or 6. The value of the parameter is equal to the value of ccb_right_shift_level_flag. If ccb_right_shift_level_flag is absent, the value of the parameter is 0.

It may be noted that, in the present disclosure, based on the above Table 2, the TSRC method sets the syntax elements decoded in the context mode in two rounds. For any one coefficient, a maximum of 4 syntax elements decoded in the context mode may be processed in each of the first and second rounds. Therefore, only when RemCcbs>=4 is true can the syntax elements decoded in the context mode be processed in the first or second round. That is, the syntax element decoded in the context mode will not be processed when RemCcbs<4.

Accordingly, in the present disclosure, if the value of the context mode flag is the first value, then the initial value of the quantity parameter may be directly determined as a fixed value. For example, remBinsPass1 is set to the second quantity value, or the initial value of the quantity parameter is determined as remBinsPass1=$((1<<(\log 2\text{TbWidth}+\log 2\text{TbHeight}))\times7)>>4$ (i.e. the first shift parameter is 4), thereby reducing the number of syntax elements decoded in the context mode. If the value of the context mode flag is the second value, then a common method of determining the initial value of the quantity parameter according to the height parameter and the width parameter, may still be used. For example, based on the above Table 1, set remBinsPass1= $((1<<(\log 2\text{TbWidth}+\log 2\text{TbHeight}))\times7)>>2$.

That is to say, in the present disclosure, based on the above Table 2, for TSRC, if the context mode flag is used to determine whether the syntax elements of the coefficient of the context mode are reduced, i.e., flag context_coded_level_bins_reduced_flag is used to represent the context mode flag, then when determining the initial value RemCcbs of the quantity parameter according to the context mode flag, the statement remBinsPass1=$((1<<(\log 2\text{TbWidth}+\log 2\text{TbHeight}))\times7)>>2$ in the above Table 2 may be replaced with a conditional statement illustrated in the above Table 6.

It can be seen that after the context mode flag context_coded_level_bins_reduced_flag of the current block is determined, if context_coded_level_bins_reduced_flag is not 0, then RemCcbs=$((1<<(\log 2\text{TbWidth}+\log 2\text{TbHeight}))\times7)>>4$ is set, so that the number of syntax elements encoded in the context mode and processed later is reduced. If context_coded_level_bins_reduced_flag is 0, the method for setting the initial value of RemCcbs may be the same as the above Table 2, that is, RemCcbs=$((1<<(\log 2\text{TbWidth}+\log 2\text{TbHeight}))\times7)>>2$ is set.

Optionally, in the present disclosure, if the value of the context mode flag is the first value, then RemCcbs may be set in another method. For example, when setting a parameter, the initial value of RemCcbs may be set as RemCcbs= $((1<<(\log 2\text{TbWidth}+\log 2\text{TbHeight}))\times7)>>(2+\text{parameter}))$.

The parameter may be determined by a flag of a sequence level, a slice level, or other levels. Specifically, if the flag is absent, the value of parameter is 0. The value of the parameter may be 0, 1, 2, 3, or etc. Then the syntax may be modified without the if-else statement. The adjustment may also be more flexible.

Exemplarily, in the present disclosure, ccb_right_shift_level_flag may be set and the value of ccb_right_shift_level_flag may be 0, 1, 2, 3, 4, 5, or 6. The value of the parameter is equal to the value of ccb_right_shift_level_flag. If ccb_right_shift_level_flag is absent, then the value of the parameter is 0.

Further, in the present disclosure, the parameter value of the quantity parameter set before entering the decoding stage for syntax elements may be considered as the initial value of the quantity parameter. Therefore, even if RemCcbs=$((1<<(\log 2\text{TbWidth}+\log 2\text{TbHeight}))\times7)>>2$ is set in the manner of the above Table 1 or Table 2, the initial value of the quantity parameter may be re-set according to the method proposed in the present disclosure and the re-set parameter value may be determined as the initial value of the quantity parameter as long as the value of the context mode flag (context_coded_level_bins_disabled_flag or context_coded_level_bins_reduced_flag) is the first value before entering the decoding stage for syntax elements (that is, before performing remBinsPass1- or RemCcbs-).

At operation 1203, coefficients of the current block are encoded using at least one of the context mode or the bypass mode according to the initial value of the quantity parameter, to generate the bitstream.

In the embodiments of the present disclosure, after the initial value of the quantity parameter is determined according to the context mode flag, the encoder may use at least one of the context mode or the bypass mode to encode the coefficients of the current block according to the initial value of the quantity parameter so as to generate the bitstream.

Further, in the embodiments of the present disclosure, when encoding the coefficient of the current block using at least one of the context mode or the bypass mode according to the initial value of the quantity parameter, if the initial value of the quantity parameter is greater than or equal to a quantity threshold, then the coefficients of the current block may be encoded using the context mode to generate the bitstream. If the initial value of the quantity parameter is less than the quantity threshold, the coefficients of the current block may be encoded using the bypass mode to generate the bitstream.

It may be noted that, in the embodiments of the present disclosure, if the initial value of the quantity parameter is greater than or equal to the quantity threshold, then the coefficients of the current block may be encoded using both the context mode and the bypass mode, that is, the coefficients of the current block are encoded using at least the context mode.

It may be noted that, in the embodiments of the present disclosure, if the initial value of the quantity parameter is less than the quantity threshold, then only the bypass mode may be used to encoded the coefficients of the current block, and the context mode may no longer be used to encode the coefficients of the current block.

It can be understood that, in the present disclosure, whether for RRC or TSRC, the syntax elements encoded in the context mode are processed only when remBinsPass1>=4 is true or RemCcbs>=4 is true. Therefore, the quantity threshold may be set as 4.

It can be understood that, in embodiments of the present disclosure, the initial value of the quantity parameter is reduced or set to 0 (or 1 or 2 or 3) based on the context mode flag, and according to the initial value of the quantity parameter, it is determined whether to further encode the coefficients of the current block without the context mode.

Further, in the present disclosure, all coefficients before the position of the last significant coefficient may be sequentially encoded based on the context mode or the bypass mode, and finally the coefficients of the current block may be encoded to generate the bitstream.

It can be understood that, in the present disclosure, all coefficients before the position of the last significant coefficient may be sequentially encoded according to a preset scanning order, and the preset scanning order may be a diagonal order, a zigzag order, a horizontal order, a vertical order, a 4×4 sub-block scanning order, or any other scanning order, which is not limited in the embodiments of the present disclosure.

It may be noted that, in the present disclosure, for RRC, after entering the function residual_coding (x0, y0, log 2TbWidth, log 2TbHeight, cIdx), it is necessary to determine some information about the block size, such as determining the logarithms log 2ZoTbWidth and log 2ZoTbHeight of the block size after zero-out, where coefficients with a horizontal coordinate in a range [0, $(1<<\log 2\text{ZoTbWidth})-1$] and a vertical coordinate in a range [0, $(1<<\log 2\text{ZoTbHeight})-1$] may be significant coefficients. Here, $(1<<\log 2\text{ZoTbWidth})$ represents the width of the transform block after zero-out, and $(1<<\log 2\text{ZoTbHeight})$ represents the height of the transform block after zero-out. Then the position of the last significant coefficient is determined based on last_sig_coeff_x_prefix, last_sig_coeff_y_prefix, last_sig_coeff_x_suffix, last_sig_coeff_y_suffix, and so on. The coefficients before (preceding) the last significant coefficient in scanning order may be significant coefficients. Then the value of remBinsPass1 is further determined using a context mode flag (context_coded_level_bins_disabled_flag or context_coded_level_bins_reduced_flag). If the value of the context mode flag context_coded_level_bins_disabled_flag is the first value, then the value of remBinsPass1 may be directly determined as 0. If the value of the context mode flag context_coded_level_bins_reduced_flag is the first value, then the value of remBinsPass1 may be directly determined as a value less than $((1<<(\log 2TbWidth+\log 2TbHeight))\times7)>>2$. Then, the number of syntax element encoded using the context mode in the current block is determined via remBinsPass1. The coefficients before the last significant coefficient in scanning order need to be encoded. For the sub-blocks containing these coefficients, it is determined whether each current sub-block needs to be encoded, and if so, the method sets the syntax elements encoded in context mode in a sub-block in the first round. In the first round, for each coefficient, it may need to process at most 4 context-mode encoded syntax elements, i.e., one sig_coeff_flag, two abs_level_gtx_flag, and one par_level_flag, and remBinsPass1 is decremented by 1 each time a context-mode encoded syntax element is processed. If a coefficient is large enough, the remaining value, i.e., abs_remainder, needs to be processed after the syntax elements encoded in context mode in the first round are processed. If remBinsPass1 is already small enough (does not satisfy remBinsPass1>=4), the first round ends, and the remaining coefficients are processed directly in bypass mode, i.e., dec_abs_level.

Accordingly, in the present disclosure, for TSRC, after entering the function residual_ts_coding (x0, y0, log 2TbWidth, log 2TbHeight, cIdx), some information about the block size needs to be determined. The value of RemCcbs is further determined using the context mode flag (context_coded_level_bins_disabled_flag or context_coded_level_bins_reduced_flag). If the value of the context mode flag context_coded_level_bins_disabled_flag is the first value, then the value of RemCcbs may be directly determined as 0. If the value of the context mode flag context_coded_level_bins_reduced_flag is the first value, then the value of RemCcbs may be directly determined as a value less than $((1<<(\log 2TbWidth+\log 2TbHeight))\times7)>>2$. Then, the number of syntax element encoded using the context mode in the current block is determined via RemCcbs. The coefficients before the last significant coefficient in scanning order need to be encoded. For the sub-blocks containing these coefficients, it is determined whether the current sub-block requires to be encoded, and if so, different from the RRC described above, the TSRC method sets the syntax elements encoded in the context mode in a sub-block in two rounds, with up to four context-mode encoded syntax elements are processed for each coefficient in the first and second rounds, respectively. In the first and second rounds, RemCcbs is decremented by 1 each time a context-mode encoded syntax element is processed. If a coefficient is large enough, the remaining value, i.e., abs_remainder, needs to be processed after the context-mode encoded syntax elements have been processed in the first and second rounds. If RemCcbs is small enough (does not satisfy remBinsPass1>=4), the first two rounds will be ended and the remaining coefficients will be processed directly in bypass mode, in this case still abs_remainder.

Further, in the present disclosure, for a coefficient sign flag coeff_sign_flag, if transform_skip_flag[x0][y0][cIdx]==0|| n>lastScanPosPass1|| sh_ts_residual_ coding_disabled_flag is true, coeff_sign_flag is encoded using the bypass mode. Otherwise, coeff_sign_flag is encoded using the context mode.

It can be understood that in the present disclosure, if remBinsPass1 or RemCcbs is reduced, lastScanPosPass1 is reduced, then the number of coeff_sign_flag encoded in the context mode is also reduced. If remBinsPass1 or RemCcbs is set to 0 when context_coded_level_bins_disabled_flag is true, in the corresponding RRC or TSRC, the context mode will not be used to encode coeff_sign_flag. If the value of remBinsPass1 or RemCcbs is set as a smaller value than that configured in the existing method when context_coded_level_bins_reduced_flag is true, in the corresponding RRC or TSRC, the number of times the context mode is used during encoding coeff_sign_flag will be reduced. In this way, the number of syntax elements encoded in the context mode can be further reduced.

Further, in the present disclosure, if the value of the context mode flag is the first value, then the sub-block coded flag sb_coded_flag of the current block may be encoded using the bypass mode, and the context mode is no longer used to encode the sub-block coded flag sb_coded_flag of the current block.

It may be noted that, in the present disclosure, for TSRC, sb_coded_flag is encoded in the context mode. If sb_coded_flag is removed or sb_coded_flag is changed to be encoded in the bypass mode, then all the coefficients of the entire block are encoded in the bypass mode, which can further improve the coding speed or throughput.

Exemplarily, in the present disclosure, if the value of context_coded_level_bins_disabled_flag is the first value, then sb_coded_flag is encoded in the bypass mode. If the value of context_coded_level_bins_disabled_flag is the second value, then sb_coded_flag is encoded in the context mode.

Further, in the present disclosure, if the value of the context mode flag is the first value, then prefix information last_sig_coeff_x_prefix of a horizontal coordinate of the last significant coefficient, prefix information last_sig_coeff_y_prefix of a vertical coordinate of the last significant coefficient, suffix information last_sig_coeff_x_suffix of the horizontal coordinate of the last significant coefficient, and suffix information last_sig_coeff_y_suffix of the vertical coordinate of the last significant coefficient in the current block are determined using the bypass mode.

It may be noted that, in the present disclosure, for RRC, last_sig_coeff_x_prefix, last_sig_coeff_y_prefix, last_sig_coeff_x_suffix, and last_sig_coeff_y_suffix are encoded in the context mode. If the last_sig_coeff_x_prefix, last_sig_coeff_y_prefix, last_sig_coeff_x_suffix, and last_sig_coeff_y_suffix are removed or changed to be encoded in the bypass mode, coding speed or throughput can be further improved.

Exemplarily, in the present disclosure, if the value of context_coded_level_bins_disabled_flag is the first value, then last_sig_coeff_x_prefix, last_sig_coeff_y_prefix, last_sig_coeff_x_suffix, and last_sig_coeff_y_suffix are encoded in the bypass mode. If the value of context_coded_level_bins_disabled_flag is the second value, then last_sig_coeff_x_prefix, last_sig_coeff_y_prefix, last_sig_coeff_x_suffix, and last_sig_coeff_y_suffix are encoded in the context mode.

Embodiments of the disclosure provide an encoding method. The encoder decodes a bitstream to determine a context mode flag of a current block, determines an initial value of a quantity parameter according to the context mode flag, and encodes coefficients of the current block using at least one of a context mode or a bypass mode according to the initial value of the quantity parameter to generate a bitstream. That is to say, in the embodiments of the disclosure, when coding the coefficients, based on the context mode flag, the coder may choose whether to code the coefficients of the current block using the context mode or may perform adjustment of the initial value of the quantity parameter, thereby improving the throughput of coefficient coding and the speed of coding, reducing complexity, and implementing the simple and efficient coding method by reducing the number of syntax elements and even eliminating syntax elements for context mode coding in the process of coding the coefficients, thus improving compression performance.

Based on the above embodiments, in another embodiment of the present disclosure, in a certain case, during coefficient encoding, the number of syntax elements encoded in the context mode is reduced. That is to say, in general, the method for coefficient encoding is the same as the common method. However, in a certain case, such as during coefficient coding for videos with high bit depth, high quality, high bitrate, or high frame rate, the number of syntax elements encoded in the context mode is reduced.

Specifically, in a possible implementation of the present disclosure, the number of syntax elements coded in the context mode is reduced to 0. In another possible implementation, all coefficients are encoded in the bypass mode while reducing the number of syntax elements coded in the context mode to 0. The coefficient coding includes RRC and/or TSRC.

It may be understood that, based on the specific syntax of RRC, in residual_coding(x0, y0, log 2TbWidth, log 2TbHeight, cIdx), the number of syntax elements coded using the context mode in a block is controlled by the variable remBinsPass1. In the existing method, the initial value of remBinsPass1 is determined according to the equation remBinsPass1=$((1<<(\log 2TbWidth+\log 2TbHeight))\times 7)>>2$.

For each coefficient, a maximum of 4 syntax elements coded in the context mode may need to be processed. Therefore, for a coefficient, the syntax elements coded in the context mode can be processed only when remBinsPass1>=4 is true. remBinsPass1 is decremented by 1 each time a context-mode coded syntax element has been processed.

Further, in the embodiments of the present disclosure, by controlling remBinsPass1, the number of syntax elements coded in the context mode may be reduced, or the syntax elements of the coefficient coded in the context mode may not be used.

Exemplarily, in the present disclosure, in order to reduce the number of syntax elements coded using the context mode to 0, or to disable the syntax elements of the coefficient coded in the context mode, the statement remBinsPass1=$((1<<(\log 2TbWidth+\log 2TbHeight))\times 7)>>2$ in the specific syntax of the original RRC may be replaced with a conditional statement illustrated in the above Table 3.

```
if(context_coded_level_bins_disabled_flag){
   remBinsPass1=0
}else{
   remBinsPass1=((1<<(log2TbWidth+log2TbHeight))×7)>>2
}
``` context_coded_level_bins_disabled_flag is a flag indicating whether the syntax elements of the coefficient coded in the context mode are disabled. If the value of context_coded_level_bins_disabled_flag is 1, it may indicate that the syntax elements of the coefficient coded in the context mode are not used. Otherwise (i.e., the value of context_coded_level_bins_disabled_flag is 0), it may indicate that the syntax elements of the coefficient coded in the context mode need to be used.

Specifically, if context_coded_level_bins_disabled_flag is not 0, then remBinsPass1=0. In this case, since remBinsPass1>=4 is not true, the syntax elements coded in the context mode are not processed. Otherwise, if context_coded_level_bins_disabled_flag is 0, the method for setting the initial value of remBinsPass1 is the same as the existing method.

Exemplarily, in the present disclosure, if the number of the syntax elements coded in the context mode is reduced, the statement remBinsPass1=$((1<<(\log 2TbWidth+\log 2TbHeight))\times 7)>>2$ in the specific syntax of the original RRC may be replaced with a conditional statement illustrated in the above Table 5.

```
if(context_coded_level_bins_reduced_flag){
   remBinsPass1=((1<<(log2TbWidth+log2TbHeight))×7)>>4
}else{
   remBinsPass1=((1<<(log2TbWidth+log2TbHeight))×7)>>2
}
``` context_coded_level_bins_reduced_flag is a flag indicating whether the syntax elements of the coefficient coded in the context mode are reduced. If the value of context_coded_level_bins_reduced_flag is 1, it may indicate that the syntax elements of the coefficient coded in the context mode need to be reduced. Otherwise (i.e., the value of context_coded_level_bins_reduced_flag is 0), it may indicate that the syntax elements of the coefficient coded in the context mode do not need to be reduced.

Specifically, if context_coded_level_bins_reduced_flag is not 0, then remBinsPass1 is equal to a certain value, such as remBinsPass1=$((1<<(\log 2TbWidth+\log 2TbHeight))\times 7)>>4$, so that the number of syntax elements coded in the context mode is reduced during subsequent process. Otherwise, if context_coded_level_bins_reduced_flag is 0, the method for setting the initial value of remBinsPass1 may be the same as the existing method. Some other methods may be used to determine the value of remBinsPass1. For example, a parameter is set, and remBinsPass1=$((1<<(\log 2TbWidth+\log 2TbHeight))\times 7)>>(2+parameter)$.

The parameter may be determined by a flag of a sequence level, a slice level, or other levels. Specifically, if the flag is absent, the value of parameter is 0. The value of the parameter may be 0, 1, 2, 3, or etc. Then the syntax may be modified without the if-else statement. The adjustment may also be more flexible.

Exemplarily, in the present disclosure, ccb_right_shift_level_flag may be set and the value of ccb_right_shift_level_flag may be 0, 1, 2, 3, 4, 5, or 6. The value of the parameter is equal to the value of ccb_right_shift_level_flag. If ccb_right_shift_level_flag is absent, then the value of the parameter is 0.

Similarly, based on the specific syntax of TSRC, in residual_ts_coding(x0, y0, log 2TbWidth, log 2TbHeight, cIdx), the number of syntax elements coded using the context mode in a block is controlled by the variable RemCcbs. In the existing method, the initial value of RemCcbs is determined according to equation RemCcbs=$((1<<(\log 2TbWidth+\log 2TbHeight))\times 7)>>2$.

For each coefficient, a maximum of 4 syntax elements coded in the context mode may need to be processed in the first and the second round respectively. Therefore, for a coefficient, the syntax elements coded in the context mode can be processed only when RemCcbs>=4 is true. RemCcbs is decremented by 1 each time a context-mode decoded syntax element has been processed.

Further, in the embodiments of the present disclosure, by controlling RemCcbs, the number of syntax elements coded in the context mode may be reduced, or the syntax elements of the coefficient coded in the context mode may not be used.

Exemplarily, in the present disclosure, in order to reduce the number of syntax elements coded using the context mode to 0, or to disable the syntax elements of the coefficient coded in the context mode, the statement RemCcbs=((1<< (log 2TbWidth+log 2TbHeight))×7)>>2 in the specific syntax of the original TSRC may be replaced with a conditional statement illustrated in the above Table 4.

```
if(context_coded_level_bins_disabled_flag){
    RemCcbs=0
}else{
    RemCcbs=((1<<(log2TbWidth+log2TbHeight))×7)>>2
}
``` context_coded_level_bins_disabled_flag is a flag indicating whether the syntax elements of the coefficient coded in the context mode are disabled. If the value of context_coded_level_bins_disabled_flag is 1, it may indicate that the syntax elements of the coefficient coded in the context mode are not used. Otherwise (i.e., the value of context_coded_level_bins_disabled_flag is 0), it may indicate that the syntax elements of the coefficient coded in the context mode need to be used.

Specifically, if context_coded_level_bins_disabled_flag is not 0, then RemCcbs=0. In this case, since RemCcbs>=4 is not true, the syntax elements coded in the context mode are not processed. Otherwise, if context_coded_level_bins_disabled_flag is 0, the method for setting the initial value of RemCcbs may be the same as the existing method.

Exemplarily, in the present disclosure, if the number of the syntax elements coded in the context mode is reduced, the statement RemCcbs=((1<<(log 2TbWidth+log 2TbHeight))×7)>>2 in the specific syntax of the original TSRC may be replaced with a conditional statement illustrated in the above Table 6.

```
if(context_coded_level_bins_reduced_flag){
    RemCcbs=((1<<(log2TbWidth+log2TbHeight))×7)>>4
}else{
    RemCcbs=((1<<(log2TbWidth+log2TbHeight))×7)>>2
}
``` context_coded_level_bins_reduced_flag is a flag indicating whether the syntax elements of the coefficient coded in the context mode are reduced. If the value of context_coded_level_bins_reduced_flag is 1, it may indicate that the syntax elements of the coefficient coded in the context mode need to be reduced, otherwise (i.e., the value of context_coded_level_bins_reduced_flag is 0), it may indicate that the syntax elements of the coefficient coded in the context mode need not to be reduced.

Specifically, if context_coded_level_bins_reduced_flag is not 0, then RemCcbs is equal to a certain value, such as RemCcbs=((1<<(log 2TbWidth+log 2TbHeight))×7)>>4, so that the number of syntax elements coded in the context mode is reduced during subsequent process. Otherwise, if context_coded_level_bins_reduced_flag is 0, the method for setting the initial value of RemCcbs may be the same as the existing method. Some other methods may be used to determine the value of RemCcbs. For example, parameter is set, and RemCcbs=((1<<(log 2TbWidth+log 2TbHeight))× 7)>>(2+parameter).

The parameter may be determined by a flag of a sequence level, a slice level, or other levels. Specifically, if the flag is absent, the value of parameter is 0. The value of the parameter may be 0, 1, 2, 3, or etc. Then the syntax may be modified without the if-else statement. The adjustment may also be more flexible.

Exemplarily, in the present disclosure, ccb_right_shift_level_flag may be set and the value of ccb_right_shift_level_flag may be 0, 1, 2, 3, 4, 5, or 6. The value of the parameter is equal to the value of ccb_right_shift_level_flag. If ccb_right_shift_level_flag is absent, then the value of the parameter is 0.

It may be noted that, in the present disclosure, for a coefficient sign flag coeff_sign_flag, if transform_skip_flag [x0][y0][cIdx]==0||n>lastScanPosPass1||sh_ts_residual_coding_disabled_flag is true, coeff_sign_flag is coded using the bypass mode. Otherwise, coeff_sign_flag is coded using the context mode. If remBinsPass1 or RemCcbs is reduced, lastScanPosPass1 is reduced, then the number of coeff_sign_flag coded in the context mode is also reduced. If remBinsPass1 or RemCcbs is set to 0 when context_coded_level_bins_disabled_flag is true, in the corresponding RRC or TSRC, the context mode will not be used to encode coeff_sign_flag. If the value of remBinsPass1 or RemCcbs is set as a smaller value than that configured in the existing method when context_coded_level_bins_reduced_flag is true, in the corresponding RRC or TSRC, the number of times the context mode is used during coding of coeff_sign_flag will be reduced. In this way, the number of syntax elements coded in the context mode can be further reduced.

It may be understood that, in the present disclosure, if context_coded_level_bins_disabled_flag is used, and the value of context_coded_level_bins_disabled_flag indicates that the context mode is not used to determine the coefficients of the current block, then all the coefficients in each sub-block will not be coded by using the context mode, which will significantly improve the speed and throughput of coding of videos with high bit depth, high bitrate, high quality, and lossless compression. In case of high bit depth, high bitrate, high quality, and lossless compression, since the bitrate is high, there are high requirements for coding speed and throughput. The method of the present disclosure can be benefit to the processing ability of hardware and software of the whole system.

Further, in the present disclosure, sb_coded_flag is encoded in the context mode. If sb_coded_flag is removed or sb_coded_flag is changed to be encoded in the bypass mode, then all the coefficients of the block are encoded in the bypass mode. In this case, the entire TSRC actually uses the bypass mode completely, which can further improve the coding speed or throughput.

Exemplarily, in the present disclosure, if the value of context_coded_level_bins_disabled_flag indicates that the context mode is not used to determine the coefficients of the current block, then sb_coded_flag is encoded in the bypass mode. If the value of context_coded_level_bins_disabled_flag indicates that the context mode is used to determine the coefficients of the current block, then sb_coded_flag is encoded in the context mode.

Further, in the present disclosure, last_sig_coeff_x_prefix, last_sig_coeff_y_prefix, last_sig_coeff_x_suffix, and last_sig_coeff_y_suffix are encoded in the context mode. If the last_sig_coeff_x_prefix, last_sig_coeff_y_prefix, last_sig_coeff_x_suffix, and last_sig_coeff_y_suffix are removed or changed to be encoded in the bypass mode, then the RRC actually uses the bypass mode completely, and coding speed or throughput can be further improved.

Exemplarily, in the present disclosure, if the value of context_coded_level_bins_disabled_flag indicates that the context mode is not used to determine the coefficients of the current block, then last_sig_coeff_x_prefix, last_sig_coeff_y_prefix, last_sig_coeff_x_suffix, and last_sig_coeff_y_suffix are encoded in the bypass mode. If the value of context_coded_level_bins_disabled_flag indicates that the context mode is used to determine the coefficients of the current block, then last_sig_coeff_x_prefix, last_sig_coeff_y_prefix, last_sig_coeff_x_suffix, and last_sig_coeff_y_suffix are encoded in the context mode.

It may be noted that, in the embodiments of the present disclosure, the context_coded_level_bins_disabled_flag or context_coded_level_bins_reduced_flag may be a sequence-level flag, a picture-level flag, a slice-level flag, a block-level flag, or the like. The block-level flag includes a flag of an LCU level, a CU level, or other block levels. context_coded_level_bins_disabled_flag or context_coded_level_bins_reduced_flag may also be a flag of a higher level, such as VUI, SEI, etc.

Further, in the present disclosure, context_coded_level_bins_disabled_flag or context_coded_level_bins_reduced_flag may depend on some other flags such as a high-bit-depth flag or a high-bitrate flag. That is to say, when the value of the high-bit-depth flag or the high-bitrate flag is 1, the flag context_coded_level_bins_disabled_flag or context_coded_level_bins_reduced_flag needs to be decoded. Otherwise, the flag context_coded_level_bins_disabled_flag or context_coded_level_bins_reduced_flag does not need to be decoded.

Exemplarily, in the present disclosure, a sequence-level flag sps_high_bit_depth_flag indicates whether the current sequence is a high-bit-depth sequence. If the value of sps_high_bit_depth_flag is 1, it may indicate that the current sequence is a high-bit-depth sequence, otherwise it may indicate that the current sequence is not a high-bit-depth sequence. At the sequence level, if the value of sps_high_bit_depth_flag is 1, sps_context_coded_level_bins_disabled_flag needs to be decoded. sps_context_coded_level_bins_disabled_flag is a flag indicating that the syntax elements of the coefficient coded in the context mode in the current sequence are disabled. If the value of sps_context_coded_level_bins_disabled_flag is 1, it may indicate that the syntax elements of the coefficient coded in the context mode are not used for blocks in the current sequence. If the value of sps_context_coded_level_bins_disabled_flag is 0, it may indicate that the syntax elements of the coefficient coded in the context mode are used for block in the current slice. context_coded_level_bins_disabled_flag in the above syntax table is replaced with sps_context_coded_level_bins_disabled_flag, and the syntax elements thereof (Sequence parameter set RBSP syntax) are illustrated in Table 11.

TABLE 11

```
...
sps_high_bit_depth_flag
    if( sps_high_bit_depth_flag )
        sps_default_sb_coded_flag
    ...
```

Exemplarily, in the present disclosure, a sequence-level flag sps_high_bit_depth_flag indicates whether the current sequence is a high-bit-depth sequence. If the value of sps_high_bit_depth_flag is 1, it may indicate that the current sequence is a high-bit-depth sequence, otherwise it may indicate that the current sequence is not a high-bit-depth sequence. At a slice level, if the value of sps_high_bit_depth_flag is 1, sh_context_coded_level_bins_disabled_flag needs to be decoded. sh_context_coded_level_bins_disabled_flag is a flag indicating that the syntax elements of the coefficient coded in the context mode in the current sequence are disabled. If the value of sh_context_coded_level_bins_disabled_flag is 1, it may indicate that the syntax elements of the coefficient coded in the context mode are not used in the current slice. Otherwise (i.e., the value of sh_context_coded_level_bins_disabled_flag is 0), it may indicate that the syntax elements of the coefficient coded in the context mode are used in the current slice, and the syntax elements (Slice header syntax) thereof are illustrated as Table 12.

TABLE 12

```
...
if(sps_high_bit_depth_flag)
    sh_context_coded_level_bins_disabled_flag          u(1)
...
```

It may be noted that, in the present disclosure, the sequence-level flag sps_high_bit_depth_flag indicating whether the current sequence is a high-bit-depth sequence may be replaced with sps_high_bit_rate_flag indicating whether the current sequence is a high-bitrate sequence or with another flag indicating high bit depth, high bitrate, high quality, or lossless compression.

It may be understood that, in the embodiments of the present disclosure, the above methods in the embodiments of the present disclosure are described based on an example that the technical solution is used for all components in the video, where all components refer to, e.g., R, G, and B in the RGB format video, or Y, U, and V (Y, Cb, and Cr) in the YUV format video, and the like. Optionally, the above methods may be used only for a certain component, such as only for the Y component of the YUV format. Optionally, the above methods may be used for each component separately, i.e., whether to use for each component may be controlled separately.

It can be seen that, according to the coding method proposed in the present disclosure, during video coding with high bit depth, high bitrate, or high quality, because of a different distribution pattern of coefficients from a common video scenario, throughput of coefficient coding can be improved by reducing the number of syntax elements or even eliminating the syntax elements coded in the context mode. In addition, because the design of syntax elements coded in the context mode takes advantage of the distribution pattern of coefficients in common videos, the compression efficiency for common videos is significantly improved. However, the design of syntax elements coded in the context mode does not conform to the distribution pattern of coefficients in videos with high bit depth, high bitrate, and high quality. Reducing or even eliminating the use of syntax elements coded in context mode for videos with high bit depth, high bitrate, and high quality will not reduce the compression efficiency and can improve the compression efficiency to a certain extent instead.

It can be understood that, in the present disclosure, for a certain scenario, during coefficient encoding, the number of syntax elements coded in the context mode may be reduced. That is to say, in general, the method for coefficient coding is the same as the existing method. However, during coefficient coding for videos with high bit depth, high quality, high bitrate, or high frame rate, the number of syntax elements encoded in the context mode is reduced during coefficient encoding.

Specifically, in the present disclosure, it is optional to reduce the number of syntax elements coded in the context mode to 0. Further, it is optional to code all coefficients in the bypass mode while reducing the number of syntax elements coded in the context mode to 0. The coefficient coding includes RRC and/or TSRC.

Embodiments of the disclosure provide a coding method. The decoder decodes a bitstream to determine a context mode flag of a current block, determines an initial value of a quantity parameter according to the context mode flag, and determines coefficients of the current block using at least one of a context mode or a bypass mode according to the initial value of the quantity parameter. The encoder determines the context mode flag of the current block, determines the initial value of the quantity parameter according to the context mode flag, and encodes the coefficients of the current block using at least one of the context mode or the bypass mode according to the initial value of the quantity parameter, to generate the bitstream. That is to say, in the embodiments of the disclosure, when coding the coefficients, based on the context mode flag, the coder may choose whether to code the coefficients of the current block using the context mode or may perform adjustment of the initial value of the quantity parameter, thereby improving the throughput of coefficient coding and the speed of coding, reducing complexity, and implementing the simple and efficient coding method by reducing the number of syntax elements and even eliminating syntax elements for context mode coding in the process of coding the coefficients, thus improving compression performance.

Figure 12:
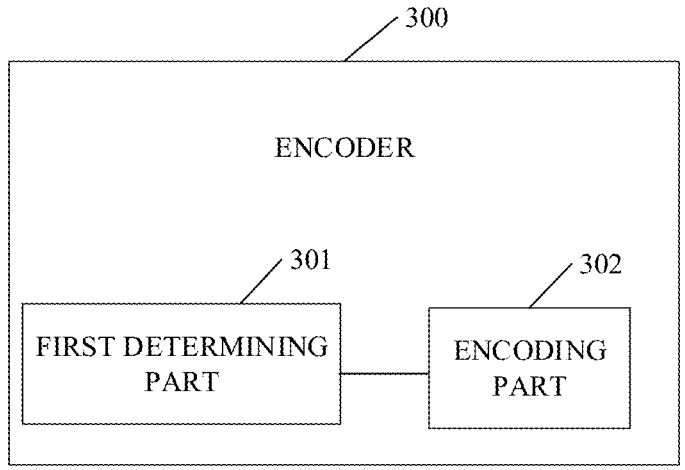
FIG. 12 is a first schematic structural diagram of an encoder provided in embodiments of the disclosure.

Based on the above embodiments, in another embodiment of the present disclosure, FIG. 12 is a first schematic structural diagram of an encoder provided in embodiments of the disclosure. As illustrated in FIG. 12, an encoder 300 provided in the embodiments of the present disclosure may include a first determining part 301 and an encoding part 302.

The first determining part 301 is configured to determine a context mode flag of a current block, and determine an initial value of a quantity parameter according to the context mode flag.

The encoding part 302 is configured to encode coefficients of the current block using at least one of a context mode or a bypass mode according to the initial value of the quantity parameter, to generate a bitstream.

Figure 13:
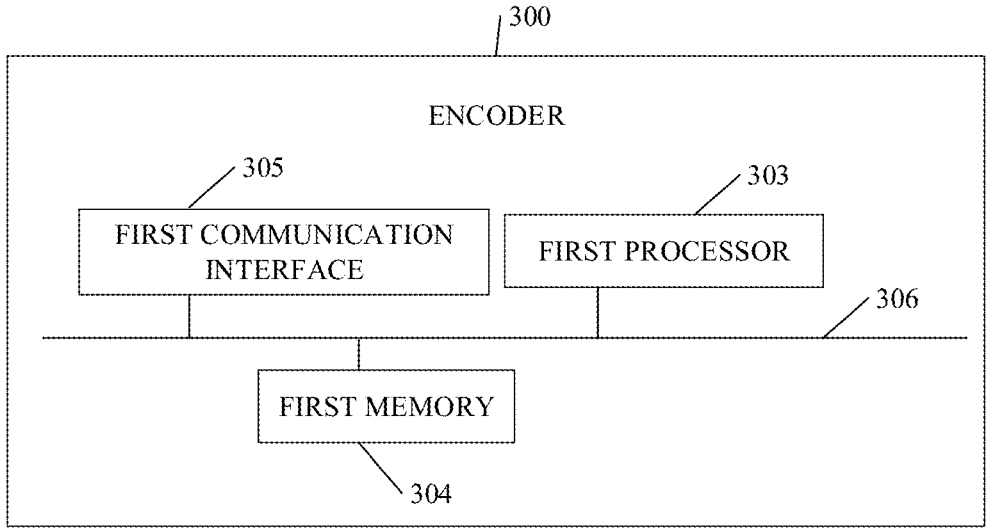
FIG. 13 is a second schematic structural diagram of an encoder provided in embodiments of the disclosure.

FIG. 13 is a second schematic structural diagram of an encoder provided in embodiments of the disclosure. As illustrated in FIG. 13, the encoder 300 may further include a first processor 303, a first memory 304 storing instructions executable by the first processor 303, a first communication interface 305, and a first bus 306 configured to connect the first processor 303, the first memory 304, and the first communication interface 305.

Further, in the embodiments of the present disclosure, the first processor 303 is configured to determine the context mode flag of the current block, determines the initial value of the quantity parameter according to the context mode flag, and encodes the coefficients of the current block using at least one of the context mode or the bypass mode according to the initial value of the quantity parameter, to generate the bitstream.

Figure 14:
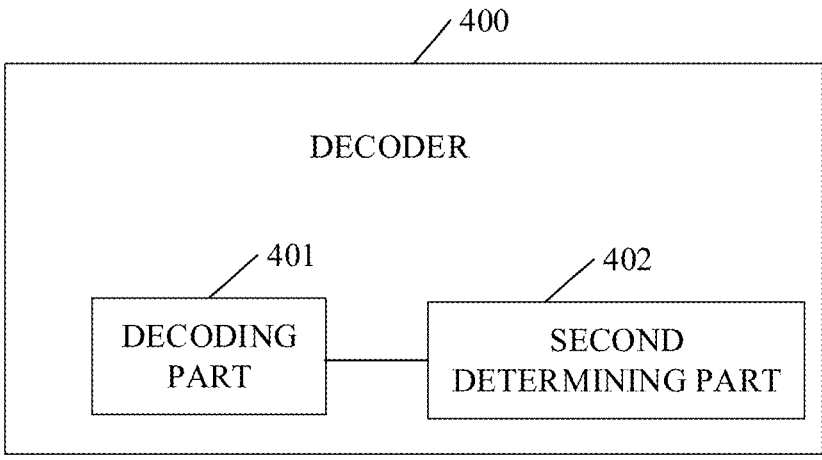
FIG. 14 is a first schematic structural diagram of a decoder provided in embodiments of the disclosure.

FIG. 14 is a first schematic structural diagram of a decoder provided in embodiments of the disclosure. As illustrated in FIG. 14, the decoder 400 may include a decoding part 401 and a second determining part 402.

The decoding part 401 is configured to decode a bitstream.

The second determining part 402 is configured to determine a context mode flag of a current block; determine an initial value of a quantity parameter according to the context mode flag; and determine coefficients of the current block using at least one of a context mode or a bypass mode according to the initial value of the quantity parameter.

Figure 15:
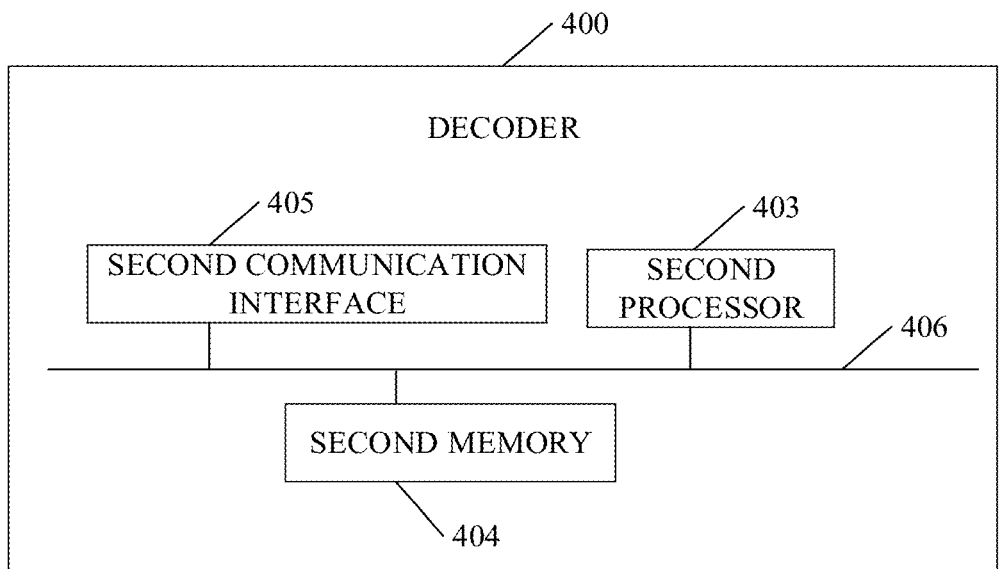
FIG. 15 is a second schematic structural diagram of a decoder provided in embodiments of the disclosure.

FIG. 15 is a second schematic structural diagram of a decoder provided in embodiments of the disclosure. As illustrated in FIG. 15, the decoder 400 may further include a second processor 403, a second memory 404 storing instructions executable by the second processor 403, a second communication interface 405, and a second bus 406 configured to connect the second processor 403, the second memory 404, and the second communication interface 405.

Further, in the embodiments of the present disclosure, the second processor 403 is configured to decode a bitstream to determine a context mode flag of a current block, determine an initial value of a quantity parameter according to the context mode flag, and determine coefficients of the current block using at least one of a context mode or a bypass mode according to the initial value of the quantity parameter.

In addition, the functional modules in the embodiments may be integrated in one processing unit, or each unit may physically exist separately, or two or more units may be integrated in one unit. The above integrated units may be implemented either in the form of hardware or in the form of software functional modules.

The integrated unit, when implemented as a software functional module and not sold or used as a stand-alone product, may be stored in a computer-readable storage medium. With this understanding, the technical solution in essence, or the part which contributes to the prior art, or all or part of the technical solution of the present embodiment may be embodied in the form of a software product. The computer software product is stored in a storage medium and includes a number of instructions to cause a computer device (which may be a personal computer, a server, or an internet device, etc.) or a processor to perform all or part of the operations of the method of the present embodiment. The aforementioned storage medium includes a USB flash drive, a removable hard disk, a read only memory (ROM), a random access memory (RAM), a diskette or a compact disc, and other media that can store program codes.

Embodiments of the disclosure provide an encoder and a decoder. The decoder decodes a bitstream to determine a context mode flag of a current block, determines an initial value of a quantity parameter according to the context mode flag, and determines coefficients of the current block using at least one of a context mode or a bypass mode according to the initial value of the quantity parameter. The encoder determines the context mode flag of the current block, determines the initial value of the quantity parameter according to the context mode flag, and encodes the coefficients of the current block using at least one of the context mode or the bypass mode according to the initial value of the quantity parameter, to generate the bitstream. That is to say, in the embodiments of the disclosure, when coding the coefficients, based on the context mode flag, the coder may choose whether to code the coefficients of the current block using the context mode or may perform adjustment of the initial value of the quantity parameter, thereby improving the throughput of coefficient coding and the speed of coding, reducing complexity, and implementing the simple and efficient coding method by reducing the number of syntax elements and even eliminating syntax elements for context mode coding in the process of coding the coefficients, thus improving compression performance.

Embodiments of the present disclosure provide a computer-readable storage medium which stores a program. The program, when executed by the processor, implements the method described in the above embodiments.

Specifically, the program instructions corresponding to the decoding method in the embodiments herein may be stored on a storage medium such as a compact disc, a hard disk, a USB flash drive, etc. When the program instructions corresponding to the decoding method in the storage medium are read or executed by an electronic device, the operations are performed.

A bitstream is decoded to determine a context mode flag of a current block.

An initial value of a quantity parameter is determined according to the context mode flag.

Coefficients of the current block are determined using at least one of a context mode or a bypass mode according to the initial value of the quantity parameter.

The target mode is used to determine the coefficients of the current block.

Specifically, the program instructions corresponding to the encoding method in the embodiments herein may be stored on a storage medium such as a compact disc, a hard disk, a USB flash drive, etc., and when the program instructions corresponding to the encoding method in the storage medium are read or executed by an electronic device, the following operations are performed.

A context mode flag of a current block is determined.

An initial value of a quantity parameter is determined according to the context mode flag.

Coefficients of the current block are encoded in at least one of a context mode or a bypass mode according to the initial value of the quantity parameter.

The target mode is used to encode the coefficients of the current block to generate a bitstream.

A person skilled in the art may understand that the embodiments of the present disclosure may be provided as methods, systems, or computer program products. Thus, the present disclosure may take the form of hardware embodiments, software embodiments, or embodiments that combine software and hardware. Further, the present disclosure may take the form of a computer program product implemented on one or more computer-usable storage media (including, but not limited to, disk memory and optical memory, etc.) that contain computer-usable program codes.

The present disclosure is described with reference to schematic implementation flowcharts and/or block diagrams of methods, devices (systems), and computer program products according to the embodiments of the present disclosure. It may be understood that computer program instructions may implement each of the processes and/or blocks in the schematic implementation flowcharts and/or block diagrams, and may implement the combination of processes and/or blocks in the schematic implementation flowcharts and/or block diagrams. These computer program instructions may be provided to a processor of a general-purpose computer, a specialized computer, an embedded processor, or other programmable data processing device to produce a machine, such that the instructions executed by the processor of the computer or other programmable data processing device produce a device for realizing the functions specified in one process or multiple processes of the schematic flowcharts and/or one block or multiple blocks of the block diagrams.

These computer program instructions may also be stored in computer-readable memory capable of directing a computer or other programmable data processing device to operate in a particular manner, such that the instructions stored in the computer-readable memory generate a manufacture including an instructional device. The instructional device implements a function specified in the one or more processes of the schematic implementation flowcharts and/or one or more blocks of the block diagrams.

These computer program instructions may also be loaded onto a computer or other programmable data processing device, such that the computer or other programmable device perform a series of operations to produce computer-implemented processing, and the instructions executed on the computer or other programmable device provide operations for implementing the function specified in one or more of the processes of the schematic implementation flowcharts and/or one or more of the blocks of the block diagrams.

The foregoing are merely some embodiments of the present disclosure and are not intended to limit the scope of protection of the present disclosure.

INDUSTRIAL APPLICABILITY

Embodiments of the disclosure provide a coding method, an encoder, a decoder, and a storage medium. The decoder decodes a bitstream to determine a context mode flag of a current block, determines an initial value of a quantity parameter according to the context mode flag, and determines coefficients of the current block using at least one of a context mode or a bypass mode according to the initial value of the quantity parameter. The encoder determines the context mode flag of the current block, determines the initial value of the quantity parameter according to the context mode flag, and encodes the coefficients of the current block using at least one of the context mode or the bypass mode according to the initial value of the quantity parameter, to generate the bitstream. That is to say, in the embodiments of the disclosure, when coding the coefficients, based on the context mode flag, the coder may choose whether to code the coefficients of the current block using the context mode or may perform adjustment of the initial value of the quantity parameter, thereby improving the throughput of coefficient coding and the speed of coding, reducing complexity, and implementing the simple and efficient coding method by reducing the number of syntax elements and even eliminating syntax elements for context mode coding in the process of coding the coefficients, thus improving compression performance.

What is claimed is:

1. A decoding method, applied to a decoder and comprising:

decoding a bitstream to determine a context mode flag of a current block;

determining a height parameter and a width parameter of the current block;

based on a value of the context mode flag being a first value, determining an initial value of a quantity parameter according to the height parameter, the width parameter, and a first shift parameter; and based on the value of the context mode flag being a second value, determining the initial value of the quantity parameter according to the height parameter, the width parameter, and a second shift parameter; and determining coefficients of the current block using at least one of a context mode or a bypass mode according to the initial value of the quantity parameter, wherein the first shift parameter and the second shift parameter each are used for right shifting, and the first shift parameter is greater than the second shift parameter.

2. The method of claim 1, wherein the context mode flag is used for determining whether the context mode is used to determine the coefficients of the current block.

3. The method of claim 1, wherein the context mode flag is used for determining whether the context mode is used to determine values of the coefficients of the current block.

4. The method of claim 1, wherein determining the coefficients of the current block using at least one of the context mode or the bypass mode according to the initial value of the quantity parameter comprises:

determining the coefficients of the current block using the context mode, when the initial value of the quantity parameter is greater than or equal to a quantity threshold.

5. The method of claim 1, wherein determining the coefficients of the current block using at least one of the context mode or the bypass mode according to the initial value of the quantity parameter comprises:

determining the coefficients of the current block using the bypass mode, when the initial value of the quantity parameter is less than a quantity threshold.

6. The method of claim 4, wherein the quantity threshold is 4.

7. The method of claim 1, further comprising:

decoding the bitstream to determine a video flag; and executing a process of determining the context mode flag, when the video flag indicates that a video meets a preset condition;

wherein the preset condition comprises one of following conditions: high bit depth, high quality, high bitrate, high frame rate, or lossless compression.

8. The method of claim 1, wherein the context mode flag is a flag of at least one of: a sequence level, a picture level, a slice level, or a block level.

9. The method of claim 1, further comprising:

determining a coefficient sign flag using the bypass mode, when the value of the context mode flag is the first value.

10. The method of claim 1, further comprising:

determining a sub-block coded flag of the current block using the bypass mode, when the value of the context mode flag is the first value.

11. The method of claim 1, further comprising:

determining, using the bypass mode, prefix information for a horizontal coordinate of a last significant coefficient, prefix information for a vertical coordinate of the last significant coefficient, suffix information for the horizontal coordinate of the last significant coefficient, and suffix information for the vertical coordinate of the last significant coefficient corresponding to the current block, when the value of the context mode flag is the first value.

12. The method of claim 1, wherein:

the first value is 1 and the second value is 0; or the first value is set as true and the second value is set as false.

13. An encoding method, applied to an encoder and comprising:

determining a context mode flag of a current block;

determining a height parameter and a width parameter of the current block;

based on a value of the context mode flag being a first value, determining an initial value of a quantity parameter according to the height parameter, the width parameter, and a first shift parameter; and based on the value of the context mode flag being a second value, determining the initial value of the quantity parameter according to the height parameter, the width parameter, and a second shift parameter; and encoding coefficients of the current block using at least one of a context mode or a bypass mode according to the initial value of the quantity parameter to generate a bitstream, wherein the first shift parameter and the second shift parameter each are used for right shifting, and the first shift parameter is greater than the second shift parameter.

14. A decoder, comprising:

a processor and a memory storing a computer program which, when executed by the processor, causes the processor to:

decode a bitstream to determine a context mode flag of a current block;

determine a height parameter and a width parameter of the current block;

based on a value of the context mode flag being a first value, determine an initial value of a quantity parameter according to the height parameter, the width parameter, and a first shift parameter; and based on the value of the context mode flag being a second value, determine the initial value of the quantity parameter according to the height parameter, the width parameter, and a second shift parameter; and determine coefficients of the current block using at least one of a context mode or a bypass mode according to the initial value of the quantity parameter, wherein the first shift parameter and the second shift parameter each are used for right shifting, and the first shift parameter is greater than the second shift parameter.

15. An encoder, comprising:

a processor and a memory storing a computer program which, when executed by the processor, causes the processor to perform the method of claim 13.

16. The method of claim 13, wherein encoding the coefficients of the current block using at least one of the context mode or the bypass mode according to the initial value of the quantity parameter comprises:

encoding the coefficients of the current block using the context mode, when the initial value of the quantity parameter is greater than or equal to a quantity threshold.

17. The method of claim 13, wherein encoding the coefficients of the current block using at least one of the context mode or the bypass mode according to the initial value of the quantity parameter comprises:

encoding the coefficients of the current block using the bypass mode, when the initial value of the quantity parameter is less than a quantity threshold.

18. The method of claim 17, wherein the quantity threshold is 4.

19. The method of claim 13, further comprising:

determining a video flag; and executing a process of determining the context mode flag, when the video flag indicates that a video meets a preset condition;

wherein the preset condition comprises one of following conditions: high bit depth, high quality, high bitrate, high frame rate, or lossless compression.

20. The method of claim 13, further comprising:

encoding, using the bypass mode, prefix information for a horizontal coordinate of a last significant coefficient, prefix information for a vertical coordinate of the last significant coefficient, suffix information for the horizontal coordinate of the last significant coefficient, and suffix information for the vertical coordinate of the last significant coefficient corresponding to the current block, when the value of the context mode flag is the first value.

* * * * *